(12) United States Patent
Raja et al.

(10) Patent No.: US 12,528,911 B2
(45) Date of Patent: Jan. 20, 2026

(54) COMPOSITION AND METHODS

(71) Applicant: VIRIDICO2 Limited, Shouthampton (GB)

(72) Inventors: Robert Raja, Southhampton Hampshire (GB); Daniel Stewart, Southhampton Hampshire (GB)

( * ) Notice: Subject to any disclaimer, the term of this patent is extended or adjusted under 35 U.S.C. 154(b) by 773 days.

(21) Appl. No.: 17/757,454

(22) PCT Filed: Dec. 16, 2020

(86) PCT No.: PCT/GB2020/053230
§ 371 (c)(1),
(2) Date: Jun. 16, 2022

(87) PCT Pub. No.: WO2021/123761
PCT Pub. Date: Jun. 24, 2021

(65) Prior Publication Data
US 2023/0062611 A1    Mar. 2, 2023

(30) Foreign Application Priority Data

Dec. 17, 2019   (WO) ................ PCT/GB2019/053596

(51) Int. Cl.
*C08G 64/02*   (2006.01)
*C08G 64/34*   (2006.01)
*C08G 65/26*   (2006.01)

(52) U.S. Cl.
CPC ......... *C08G 64/0208* (2013.01); *C08G 64/02* (2013.01); *C08G 64/34* (2013.01);
(Continued)

(58) Field of Classification Search
CPC ................ C08G 64/0208; C08G 64/34; C08G 65/2603; C08G 65/2654; C08G 65/266; C08G 64/02
See application file for complete search history.

(56) References Cited

U.S. PATENT DOCUMENTS

| 4,500,704 A | 2/1985 | Kruper, Jr. et al. |
| 4,826,953 A | 5/1989 | Kuyper et al. |

(Continued)

FOREIGN PATENT DOCUMENTS

| CA | 1262597 A | 10/1989 | |
| WO | 2013/034750 A2 | 3/2013 | |
| WO | WO-2016081685 A1 * | 5/2016 | ............ B01J 31/16 |

OTHER PUBLICATIONS

First Office Action; JP100083; Jun. 29, 2023.
(Continued)

*Primary Examiner* — Rabon A Sergent
(74) *Attorney, Agent, or Firm* — PatShegen; Moshe Pinchas

(57) ABSTRACT

A composition comprising: a bulk material; and at least one surface; the bulk material comprising ions of a metal M bonded to one another via linker groups; the surface comprising ions of a metal M' bonded to one another via linker groups; the metals M and M' being the same or different; the surface comprising at least one first site A and at least one second, different site B; the site A having a hydroxyl group bonded thereto; the site B being a Lewis acidic site; is described. Methods of forming the composition and the use of the composition as a catalyst, in particular to catalyse reactions in which $CO_2$ is incorporated into the structure of a molecule, in particular a polymer, are also described.

25 Claims, 12 Drawing Sheets

(52) U.S. Cl.
CPC ..... C08G 65/2603 (2013.01); C08G 65/2654 (2013.01); C08G 65/266 (2013.01)

(56) References Cited

U.S. PATENT DOCUMENTS

| | | |
|---|---|---|
| 4,943,677 A | 7/1990 | Rokicki |
| 4,981,948 A | 1/1991 | Kawachi et al. |
| 5,026,676 A | 6/1991 | Motika et al. |

OTHER PUBLICATIONS

Advance of Metal-Organic Framework Material in Catalysis; 2016.
Office Action Summary; Jan. 9, 2024.
RSC Advances; Structure Activity Relationships in Metal-Organic Framework Catalysts for the Continuous Flow Synthesis of Propylene Carbonate From CO2 and Propylene Oxide; 2018.
International Preliminary Report on Patentability; Switzerland; May 17, 2022.
John P S Mowat et al: "Synthesis, Characterisation and Adsorption Properties of Microporous Scandium Carboxylates With Rigid and Flexible Frameworks," Dec. 11, 2010.
Laura Mitchell et al: "Remarkable Lewis Acid Catalytic Performace of the Scandium Trimesate Metal Organic Framework MIL-100 (SC) for C—C and C?N Bond-Forming Reactions." Jan. 1, 2013-.
Liang Jun et al: "Metal-Organic Frameworks and Porous Organic Polymers for Sustainable Fixation of Carbon Dioxide Into Cyclic Carbonates".
Qingyang Meng et al: "Copolymerization of CO2 and Propylene Oxide Using ZnGA/DMC Composite Catalyst for High Molecular Weight Poly (Propylene Carbonate)".
Zhu, Q. et al. Polym. Int. 2002, 51 (10), 1079-1085.
Eberhardt, R. et al. Macromol. Chem. Phys. 2004, 205 (1), 42-47.
Marbach, J.; et al. Catal. Sci. Technol. 2017, 7 (13), 2897-2905.
Ree, M. et al. J. Polym. Sci. Part Polym. Chem. 1999, 37 (12), 1863-1876.
Ree, M. et al.; Catal. Today 2006, 115 (1), 134-145.
Cabello, C. P., et al. Cryst. Eng. Comm 2015, 17, 430-437.
Cabello, C. P. et al., Microporous Mesoporous Mater. 2014, 190, 234-239.
Mitchell et al., Chem. Eur. J. 2014, 20, 17185-17197.
Giovine et al. Chem. Eur. J. 2017, 23, 9525-9534.
Li et al. Chinese Journal of Inorganic Chemistry, 2011 27, 5, 951-956.
S. Klaus, et al. J. Am. Chem. Soc., 2011, 133, 13151-13161.
R.-R. Ang, et al, Chem. Eng. J., 2017, 327, 120-127.
J.-S. Kim, et al, J. Catal., 2003, 218, 209-219.
I. Kim et al, Macromol. Symp., 2005, 224, 181-192.
I. Kim, et al, Catal. Today, 2006, 111, 292-296.
S. Chen, et al, J. Polym. Sci. Part Polym. 32. Chem., 2004, 42, 5284-5291.
N. Almora-Barrios, et al, ChemCatChem, 2015, 7, 928-935.
S. Hayashi and K. Hayamizu, Bull. Chem. Soc. Jpn., 1991, 64, 685-687.

* cited by examiner

COMPOSITION AND METHODS

FIELD OF THE INVENTION

This invention relates to a composition useful as a catalyst. It also relates to methods of producing the composition and the use of the composition for catalysing reactions, particularly although not exclusively reactions involving the incorporation of $CO_2$ into a molecular structure.

BACKGROUND TO THE INVENTION

As environmental concerns over greenhouse gas emissions increase, the fixation and utilisation of abundant carbon dioxide ($CO_2$) remains a pivotal area of research. A widely-reported method for $CO_2$ utilisation is the catalytic ring-opening copolymerisation (ROCOP) of epoxides and $CO_2$ to form poly(alkylene) carbonates.

The use of high energy substrates, such as epoxides, provide a sustainable alternative to traditional ring-opening polymerisations (ROP) of cyclic carbonate monomers or toxic polycondensations with trans-diols and phosgene to provide aliphatic polycarbonates, whilst consuming carbon dioxide. In particular, the formation of poly(propylene) carbonate (PPC) from propylene oxide (PO) and $CO_2$, in the presence of a suitable catalyst, can produce a polymer in which 43% of the polymer weight is attributed to $CO_2$. Low molecular weight ($M_n$) PPCs possessing hydroxyl terminating groups, or 'polycarbonate polyols', serve as sustainable replacements for polyether polyols in the manufacture of polyurethane, a material that finds ubiquitous use as flexible or rigid foams, sealants, coatings and elastomers. As the synthesis of polyurethane relies on the homopolymerisation of petrochemically derived epoxides, replacement of some of this epoxide with renewable $CO_2$ through the ROCOP pathway offers a step towards a reduced dependence on petrochemical feedstocks.

Most commonly, ROCOP is catalysed by homogeneous metal-complexes with Lewis acidity, with chromium(III)- or cobalt(III)-salts and Zn-β-diiminate complexes among the most active. Unfortunately, removal of these catalysts from the polymer product is not facile, and there exist few viable examples of heterogeneous, recyclable catalysts, which can perform this transformation with appreciable catalytic turnover and without the requirement of a nucleophilic co-catalyst or solvent.

Examples of recoverable, easily separated heterogeneous systems, with high polycarbonate selectivity have been limited to double metal cyanide (DMC) complexes and zinc glutarates (ZnGAs). For example, U.S. Pat. Nos. 4,943,677, 4,981,948 and 5,026,676 all describe the synthesis of zinc glutarate catalysts which are used for the copolymerisation reaction between $CO_2$ and epoxides to form poly(alkylene carbonates).

Similarly, Zhu, Q. et al. *Polym. Int.* 2002, 51 (10), 1079-1085; Eberhardt, R. et al. *Macromol. Chem. Phys.* 2004, 205 (1), 42-47; and Marbach, J.; et al. *Catal. Sci. Technol.* 2017, 7 (13), 2897-2905, Ree, M. et al. *J. Polym. Sci. Part Polym. Chem.* 1999, 37 (12), 1863-1876; and Ree, M. et al.; *Catal. Today* 2006, 115 (1), 134-145 all describe the synthesis of zinc glutarate catalysts which are used for the copolymerisation reaction between $CO_2$ and epoxides to form poly(alkylene carbonates).

Zinc glutarate catalysts suffer from a number of disadvantages: they require high pressures (typically 40 to 50 atmospheres $CO_2$), higher temperatures (typically 60-100° C.), higher metal loadings (typically 30 wt % Zn), long reaction times (typically 40 hours), and pressing reaction parameters for desirable polymer yields.

U.S. Pat. Nos. 4,500,704, 4,826,953, and CA1262597A, describe the synthesis of double metal cyanide catalysts which are used for the copolymerisation reaction between $CO_2$ and epoxides to form poly(alkylene carbonates).

Similarly, Meng, Q. et al *J. CO2 Util.* 2016, 16, 86-96, describes the synthesis of a composite double metal cyanide/zinc glutarate catalyst which is used for the copolymerisation reaction between $CO_2$ and epoxides to form poly (alkylene carbonates). The reaction described in this document uses NP-40, a non-ionic surfactant, which is stated to restrain particle growth of zinc glutarate. However, the document does not describe the effect of the compound on the crystallite size of the catalyst thus produced. In addition, double metal cyanides have very poor ability to insert $CO_2$ into a polymer (typically 10-56% $CO_2$ insertion based on the literature). Therefore, when used to catalyse this copolymerisation reaction, the majority product tends to be polyether, not polycarbonate. Furthermore, the polymers produced according to the process described in this article are high molecular weight polymers, all having a number averaged molecular weight ($M_n$) of over 10 kDa.

Metal-organic framework (MOF) complexes are generally known in the art. Generally, MOFs comprise a structure of metal ions bound together via multivalent linker groups which coordinate to the metal ions. One example of a MOF is the structure known as MIL-100 in which trivalent metal ions are linked together by benzene-1,3,5-tricarboxylate (trimesate) linker groups. The metal ion may be $Cr^{3+}$, $Fe^{3+}$, $Al^{3+}$, $V^{3+}$, $Sc^{3+}$ or $In^{3+}$.

MOFs have emerged as versatile materials in many fields, due to their exceptional porosity and the ease by which the structural components can be modified to provide a bespoke material. Based on their innate $CO_2$ sorption capabilities, many MOFs have been explored as potential catalysts for the ROCOP reaction: Cabello, C. P., et al. *Cryst. Eng. Comm* 2015, 17, 430-437 and Cabello, C. P. et al., *Microporous Mesoporous Mater.* 2014, 190, 234-239. However, to date MOFs have only been shown to form the thermodynamically favoured cyclic carbonate product, often with the assistance of a tertiary ammonium halide co-catalyst, with no examples to date of copolymerisation occurring. The activity of these MOFs has been attributed to the regular array of Lewis acidic sites (described below as "B-sites") within the framework of the composition. Typically, the epoxide binds to the B-site. A nucleophilic co-catalyst (usually a tertiary ammonium halide) ring opens the epoxide, which remains bound to the B-site via a metal-alkoxy bond. $CO_2$ then inserts into the metal-alkoxy bond and chain propagation continues at the B-site.

One such example of a MOF is MIL-100(Sc) which is a highly porous, trimesate-based MOF formed from corner sharing supertetrahedral with trigonal prismatic oxidic-metal trimers at the vertices. A number of publications describe MIL-100(Sc), its synthesis and characterisation, and reactions that the framework can facilitate.

For example, J. P. S. Mowat et al. *Microporous and Mesoporous Materials* 2011, 142, 322-333, describes the synthesis, characterisation and adsorption properties of microporous scandium carboxylates with rigid and flexible frameworks. In addition, Mitchell et al. *Catal. Sci. Technol.,* 2013, 3, 606-617, describes MIL-100(Sc) and its use as a Lewis acid catalyst for C—C and CQN bond-forming reactions (ene reaction of an activated carbonyl). However, neither publication explicitly describes that the distance between the sites defined herein as A-sites and B-sites are in sufficient proximity to enable the compositions to interact with monomers (in particular monomers and $CO_2$) so as to be able to catalyse polymerisation reactions, in particular those in which $CO_2$ is incorporated into the structure of the polymer. Moreover, there is no evidence in either publication (e.g. from SEM or TEM images) that the method achieves the crystallite or particle control achieved using the methods of the present invention.

Mitchell et al., *Chem. Eur. J.* 2014, 20, 17185-17197, describes mixed-metal MIL-100(Sc,M) (wherein M=Al, Cr, Fe) and its use for Lewis acid catalysis and tandem C—C bond formation and alcohol oxidation. Giovine et al. *Chem. Eur. J.* 2017, 23, 9525-9534 describes the analysis of MIL-100(Sc) by solid-state NMR spectroscopy. Li et al. *Chinese Journal of Inorganic Chemistry,* 2011 27, 5, 951-956, describes the metal-organic frameworks of scandium carboxylate with MIL-100 and MIL-101 structures.

However, none of these publications describe a composition wherein the bulk material comprises metal ions bonded to one another via linker groups, but having a surface structure in which hydroxyl-bound sites (also described herein as "A-sites") are present in sufficient proximity to the Lewis acidic B-sites to enable both the A-sites and B-sites to maximise the catalytic activity. A composition which can function as a hybrid platform catalyst (as described and claimed herein) having both of these sites at a distance from one another to enable them both to function in catalysis has not been taught in the art, nor is the use of such a composition in a method forming a polymer in which $CO_2$ is incorporated into the structure of the polymer, as described and claimed herein.

J. Liang et al. *Coordination Chemistry Reviews,* 2019, 378, 32-65 provides a review of the capture and fixation of $CO_2$ into cyclic carbonates, and their catalysis by metal-organic frameworks and porous organic polymers. However, this publication also does not explicitly describe that the distance between the sites defined herein as A-sites and B-sites are in sufficient proximity to enable the compositions to interact with monomers (in particular monomers and $CO_2$) so as to be able to catalyse polymerisation reactions, in particular those in which $CO_2$ is incorporated into the structure of the polymer. In addition, there is no evidence in this publication (e.g. from SEM or TEM images) that the method achieves the crystallite or particle control achieved using the methods of the present invention.

SUMMARY OF THE INVENTION

In one aspect of the invention, there is provided a composition comprising:
- a bulk material; and
- at least one surface;
- the bulk material comprising ions of a metal M bonded to one another via linker groups;
- the surface comprising ions of a metal M' bonded to one another via linker groups;
- the metals M and M' being the same or different;
- the surface comprising at least one first site A and at least one second, different site B;
- the site A having a hydroxyl group bonded thereto, said site A optionally being capable of interacting with $CO_2$;
- the site B being a Lewis acidic site capable of binding a $CO_2$ molecule;
- wherein the distance d between the site A and site B is such that a monomer molecule Y and the bound $CO_2$ can react together on the surface to form a polymer in which $CO_2$ is incorporated into the structure of the polymer.

In another aspect, there is provided a composition comprising:
- a bulk material; and
- at least one surface;
- the bulk material comprising ions of a metal M bonded to one another via linker groups;
- the surface comprising ions of a metal M' bonded to one another via linker groups;
- the metals M and M' being the same or different;
- the surface comprising at least one first site A and at least one second, different site B;
- the site A having a hydroxyl group bonded thereto, said site A being capable of interacting with a monomer molecule;
- the site B being a Lewis acidic site, said site B being capable of interacting with a monomer molecule;
- wherein the distance d between the site A and site B is such that monomer molecules can polymerise on the surface to form a polymer.

In another aspect, there is provided a composition comprising:
- a bulk material; and
- at least one surface;
- the bulk material comprising ions of a metal M bonded to one another via linker groups;
- the surface comprising ions of a metal M' bonded to one another via linker groups;
- the metals M and M' being the same or different;
- the surface comprising at least one first site A and at least one second, different site B; the site A having a hydroxyl group bonded thereto, said site A being capable of interacting with a monomer molecule;
- the site B being a Lewis acidic site, said site B being capable of interacting with a monomer molecule;
- the composition being obtainable by reacting a source of metal ions M and M' with a source of linker groups and a source of hydroxyl groups in the presence of a modulator, under conditions such that the surface of the composition has first sites A to which the hydroxyl groups are bound, and second sites B which are Lewis acidic.

In another aspect, there is provided a crystallite composition comprising:
- a bulk material; and
- at least one surface;
- the bulk material comprising ions of a metal M bonded to one another via linker groups;
- the surface comprising ions of a metal M' bonded to one another via linker groups;
- the metals M and M' being the same or different;
- the surface comprising at least one first site A and at least one second, different site B;
- the site A having a hydroxyl group bonded thereto, said site A being capable of interacting with a monomer molecule;
- the site B being a Lewis acidic site, said site B being capable of interacting with a monomer molecule.

In another aspect, there is provided a composition comprising:
- a bulk material; and
- at least one surface;
- the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B;

the site A having a hydroxyl group bonded thereto;

the site B being a Lewis acidic site;

wherein the distance d between the site A and site B is such that monomer molecules can polymerise on the surface to form a polymer.

In another aspect, there is provided a composition comprising:

a bulk material; and at least one surface;

the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B;

the site A having a hydroxyl group bonded thereto;

the site B being a Lewis acidic site;

the composition being obtainable by reacting a source of metal ions M and M' with a source of linker groups and a source of hydroxyl groups in the presence of a modulator, under conditions such that the surface of the composition has first sites A to which the hydroxyl groups are bound, and second sites B which are Lewis acidic.

In another aspect, there is provided a crystallite composition comprising:

a bulk material; and at least one surface;

the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B;

the site A having a hydroxyl group bonded thereto; and the site B being a Lewis acidic site.

In a further aspect of the invention, there is provided a method of forming the composition of the invention, comprising reacting a source of metal ions M and M' with a source of linker groups and a source of hydroxyl groups in the presence of a modulator, and subjecting the composition to conditions such that the surface of the composition has first sites A to which the hydroxyl groups are bound, and second sites B which are Lewis acidic.

In a further aspect of the invention, there is provided a method of forming the composition of the invention, comprising reacting a source of metal ions M and M' with a source of linker groups and a source of hydroxyl groups, and subjecting the composition to conditions such that the surface of the composition has first sites A to which the hydroxyl groups are bound, and second sites B which are Lewis acidic.

In a further aspect of the invention, there is provided use of the composition of the invention as a catalyst, particularly although not exclusively as a catalyst to catalyse a polymerisation reaction.

In a further aspect of the invention, there is provided a method of forming a polymer, the method comprising polymerising a monomer in the presence of a composition of the invention.

In a further aspect of the invention, there is provided a method of forming a polymer in which $CO_2$ is incorporated into the structure of the polymer, the method comprising polymerising a monomer in the presence of $CO_2$ and a composition of the invention.

In a further aspect of the invention, there is provided a method of forming a polymer, the method comprising polymerising a monomer in the presence of a composition comprising:

a bulk material; and at least one surface;

the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B; the site A having a hydroxyl group bonded thereto, said site A capable of interacting with a monomer molecule;

the site B being a Lewis acid site capable of interacting with a monomer molecule; wherein the distance d between the site A and site B is such that the monomer molecules can polymerise on the surface to form the polymer.

In a further aspect of the invention, there is provided a method of forming a polymer, the method comprising polymerising a monomer in the presence of a crystallite composition comprising:

a bulk material; and at least one surface;

the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B;

the site A having a hydroxyl group bonded thereto, said site A capable of interacting with a monomer molecule; and the site B being a Lewis acid site capable of interacting with a monomer molecule.

In a further aspect of the invention, there is provided a method of forming a polymer, the method comprising polymerising a monomer in the presence of a composition comprising:

a bulk material; and at least one surface;

the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B;

the site A having a hydroxyl group bonded thereto, said site A being capable of interacting with a monomer molecule;

the site B being a Lewis acidic site, said site B being capable of interacting with a monomer molecule;

the composition being obtainable by reacting a source of metal ions M and M' with a source of linker groups and a source of hydroxyl groups in the presence of a modulator, under conditions such that the surface of the composition has first sites A to which the hydroxyl groups are bound, and second sites B which are Lewis acidic.

In a further aspect of the invention, there is provided a method of forming a polymer in which $CO_2$ is incorporated into the structure of the polymer, the method comprising reacting:

(a) a molecule Y, which is a monomer capable of polymerising to form a polymer in which $CO_2$ is incorporated into the structure of the polymer; and (b) $CO_2$;

in the presence of a composition comprising a bulk material; and at least one surface;

the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B; the site A having a hydroxyl group bonded thereto, said site A optionally being capable of interacting with $CO_2$;

the site B being a Lewis acid site capable of binding a $CO_2$ molecule such that the bound $CO_2$ molecule can react with the monomer molecule Y;

wherein the distance d between the site A and site B is such that the molecule Y and the bound $CO_2$ can react together on the surface to form the polymer.

In a further aspect of the invention, there is provided a method of forming a polymer in which $CO_2$ is incorporated into the structure of the polymer, the method comprising reacting:

(a) a molecule Y, which is a monomer capable of polymerising to form a polymer in which $CO_2$ is incorporated into the structure of the polymer; and (b) $CO_2$;

in the presence of a crystallite composition comprising a bulk material; and at least one surface;

the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B;

the site A having a hydroxyl group bonded thereto, said site A optionally being capable of interacting with $CO_2$;

the site B being a Lewis acid site capable of binding a $CO_2$ molecule such that the bound $CO_2$ molecule can react with the monomer molecule Y; such that the molecule Y and the bound $CO_2$ react together on the surface to form the polymer.

In a further aspect of the invention, there is provided a method of forming a polymer in which $CO_2$ is incorporated into the structure of the polymer, the method comprising reacting:

(a) a molecule Y, which is a monomer capable of polymerising to form a polymer in which $CO_2$ is incorporated into the structure of the polymer; and (b) $CO_2$;

in the presence of a composition comprising a bulk material; and at least one surface;

the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B; the site A having a hydroxyl group bonded thereto, said site A optionally being capable of interacting with $CO_2$;

the site B being a Lewis acid site capable of binding a $CO_2$ molecule such that the bound $CO_2$ molecule can react with the monomer molecule Y; such that the molecule Y and the bound $CO_2$ react together on the surface to form the polymer;

the composition being obtainable by reacting a source of metal ions M and M' with a source of linker groups and a source of hydroxyl groups in the presence of a modulator, under conditions such that the surface of the composition has first sites A to which the hydroxyl groups are bound, and second sites B which are Lewis acidic.

In a yet further aspect of the invention, there is provided a method of forming a cyclic carbonate in which $CO_2$ is incorporated into the structure of the cyclic carbonate, the method comprising reacting a molecule Y' with $CO_2$ in the presence of a composition comprising:

a bulk material; and at least one surface;

the bulk material comprising ions of a metal M bonded to one another via linker groups;

the surface comprising ions of a metal M' bonded to one another via linker groups;

the metals M and M' being the same or different;

the surface comprising at least one first site A and at least one second, different site B;

the site A having a hydroxyl group —X bonded thereto;

the site B being a Lewis acid site capable of interacting with a $CO_2$ molecule in a manner which orientates the $CO_2$ molecule so as to facilitate reaction with the molecule Y';

the site B having a Lewis base bound thereto;

wherein the distance d' between the site A and site B is such that the molecule Y' and the adsorbed $CO_2$ can react together on the surface to form the cyclic carbonate.

DETAILED DESCRIPTION

Advantages and Surprising Findings

Figure 1:
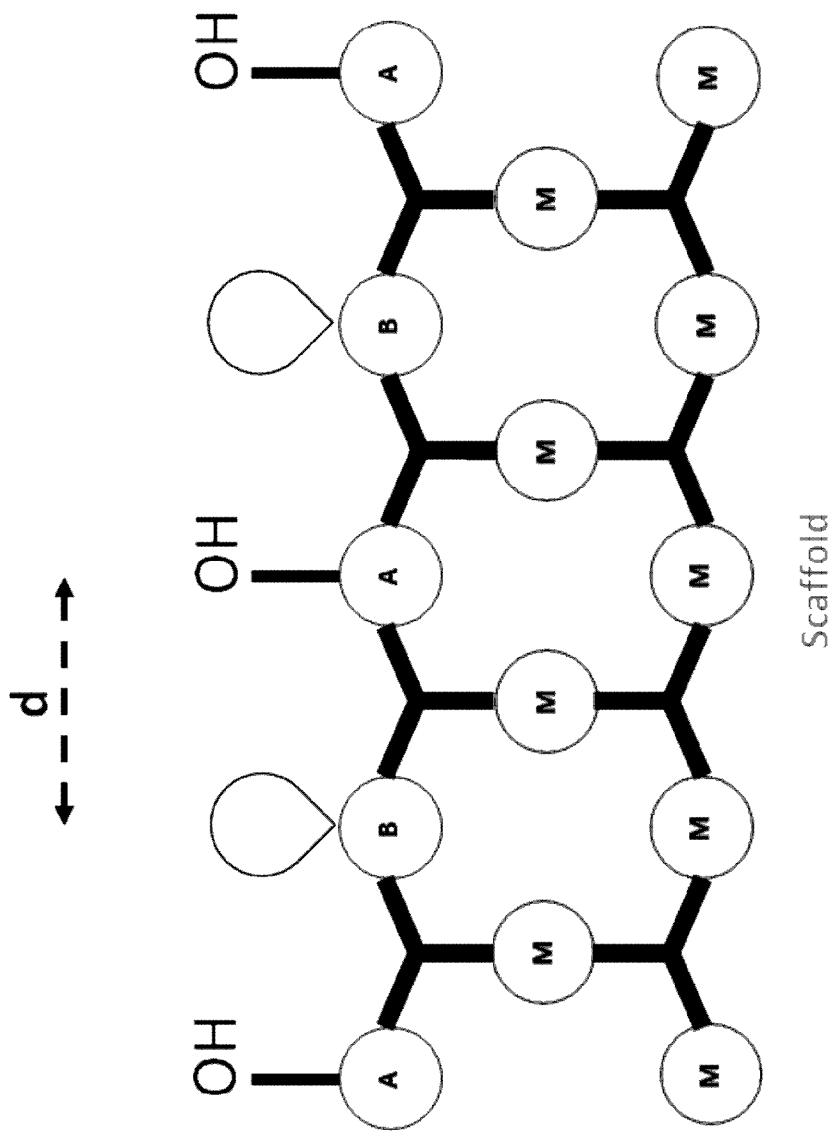
FIG. 1 illustrates the general structure of the bulk material and surface structure of a hybrid platform catalyst composition according to one embodiment of the invention, wherein the metal ions M and M' are linked by trivalent linkers and showing unoccupied Lewis acid sites B.

It has been surprisingly found by the present inventors that a composition of the invention can be produced having a surface in which hydroxyl-bound sites (also described herein as "A-sites") are present on the surface in sufficient density and in sufficient proximity to Lewis acidic sites (also described below as "B-sites") on the surface, such that, in use, both the A-sites and B-sites can participate in catalytic activity. These favourable surface properties enable it to be useful as a hybrid platform catalyst for a range of reactions, particularly those involving the insertion of a $CO_2$ unit into the structure of a molecule, thereby permitting $CO_2$ utilisation.

It has been surprisingly found by the present inventors that the composition of the invention can be used to catalyse a polymerisation reaction in which $CO_2$ is incorporated into the structure of the polymer, for example a polycarbonate-polyether copolymer from an epoxide (such as propylene oxide) and $CO_2$, under much milder conditions than are disclosed the prior art. In particular, the reaction can be carried out at lower temperatures, lower pressures and for much shorter reaction times than are disclosed in the prior art. It also provides a higher selectivity for producing a polycarbonate-polyether copolymer over cyclic carbonate), with comparable carbonate linkages in the polymer backbone.

In particular, it has been surprisingly found that the surface properties of the composition of the present invention enables it to catalyse a polymerisation reaction in which $CO_2$ is incorporated into the structure of the polymer, for example a polycarbonate-polyether copolymer from an epoxide (such as propylene oxide) and $CO_2$, in which a high amount of $CO_2$ insertion is possible such that a high percentage of carbonate linkages are incorporated into the polymer.

In addition, it has surprisingly been found by the present inventors that the incorporation of a modulator (as defined and exemplified below) into the composition of the invention, particularly using the modulator and source of linker groups in specific molar ratios, enables the composition to be produced with greater control of the crystallite size and particle morphology than has been demonstrated in the prior art.

Furthermore, it has surprisingly been found that the compositions so produced are able to catalyse polymerisation reactions, in particular polymerisation reactions in which $CO_2$ is incorporated into the structure of the polymer, in which the polymer so produced has a lower average molecular weight (Mn), typically below 10 kDa than was possible when those reactions were carried out using the catalysts of the prior art. Polymers having such molecular weights are more commercially useful than corresponding polymers of higher molecular weight as produced in the art.

Definitions

As used herein, the term "crystallite" generally means a small single crystal (i.e. a small single solid material in which the crystal lattice of the material is continuous and unbroken, with no grain boundaries). Single crystal materials should be contrasted with polycrystalline or agglomerate materials which comprise a collection of crystals adhered together. Typically the size of such crystallites ranges from 1 nm to 1 μm, preferably 1 nm to 100 nm.

As used herein, the term "modulator" means a small organic molecule capable of binding to a metal ion. The modulator is a different organic molecule from the organic molecule which provides the source of linker groups. Typically, the modulator has a molecular weight of 30 to 900 Da. In one embodiment, the modulator has a molecular weight of 40 to 750 Da. In one embodiment, the modulator has a molecular weight of 50 to 600 Da. In one embodiment, the modulator has a molecular weight of 60 to 500 Da. In one embodiment, the modulator has a molecular weight of 70 to 400 Da. In one embodiment, the modulator has a molecular weight of 80 to 350 Da. In one embodiment, the modulator has a molecular weight of 90 to 300 Da. In one embodiment, the modulator has a molecular weight of 100 to 250 Da. In one embodiment, the modulator has a molecular weight of 60 to 180 Da. In one embodiment, the modulator has a molecular weight of 100 to 170 Da. In one embodiment, the modulator has a molecular weight of 110 to 200 Da.

As used herein, "alkyl" means a straight or branched chain saturated aliphatic group containing only carbon and hydrogen, such as methyl, ethyl, n-propyl, iso-propyl, n-butyl, iso-butyl, sec-butyl, tert-butyl, n-pentyl, iso-pentyl, sec-pentyl and neo-pentyl. Alkyl groups can either be unsubstituted or substituted with one or more substituents, as described below. In some embodiments, alkyl groups include 1 to 8 carbon atoms (for example, 1 to 6 carbon atoms, 1 to 4 carbon atoms, or 1 to 2 carbon atoms).

As used herein, "alkenyl" means a straight or branched chain aliphatic group containing only carbon and hydrogen and containing at least one carbon-carbon double bond, such as ethenyl, 1-propenyl, 2-propenyl, 2-methyl-1-propenyl, 1-butenyl, 2-butenyl, and the like. In various embodiments, alkenyl groups can either be unsubstituted or substituted with one or more substituents, as described below. Typically, alkenyl groups will comprise 2 to 8 carbon atoms (for example, 2 to 6 carbon atoms, 2 to 4 carbon atoms, or 2 carbon atoms).

As used herein, "alkynyl" means a straight or branched chain aliphatic group containing only carbon and hydrogen and containing at least one carbon-carbon triple bond, such as ethynyl, 1-propynyl, 1-butynyl, 2-butynyl, and the like. In various embodiments, alkynyl groups can either be unsubstituted or substituted with one or more substituents. Typically, alkynyl groups will comprise 2 to 8 carbon atoms (for example, 2 to 6 carbon atoms, 2 to 4 carbon atoms, or 2 carbon atoms).

As used herein, "alkylene" means a bivalent branched, or straight chain saturated group containing only carbon and hydrogen, such as methylene, ethylene, n-propylene, iso-propylene, n-butylene, iso-butylene, sec-butylene, tert-butylene, n-pentylene, iso-pentylene, sec-pentylene and neo-pentylene. Alkylene groups can either be unsubstituted or substituted with one or more substituents. In some embodiments, alkylene groups include 1 to 8 carbon atoms (for example, 1 to 6 carbon atoms, 1 to 4 carbon atoms, or 1 to 2 carbon atoms).

As used herein, "alkenylene" means a bivalent branched, or straight chain group containing only carbon and hydrogen and containing at least one carbon-carbon double bond, such as ethenylene, 1-propenylene, 2-propenylene, 2-methyl-1-propenylene, 1-butenylene, 2-butenylene, and the like. In various embodiments, alkenylene groups can either be unsubstituted or substituted with one or more substituents. Typically, alkenylene groups will comprise 2 to 8 carbon atoms (for example, 2 to 6 carbon atoms, 2 to 4 carbon atoms, or 2 carbon atoms).

As used herein, "alkynylene" means a bivalent branched, or straight chain chemical group containing only carbon and hydrogen and containing at least one carbon-carbon triple bond, such as ethynylene, 1-propynylene, 1-butynylene, 2-butynylene, and the like. In various embodiments, alkynylene groups can either be unsubstituted or substituted with one or more substituents. Typically, alkynylene groups will comprise 2 to 8 carbon atoms (for example, 2 to 6 carbon atoms, 2 to 4 carbon atoms, or 2 carbon atoms).

As used herein, "cycloalkyl" means a saturated cyclic ring system containing only carbon atoms in the ring system backbone, such as cyclopropyl, cyclobutyl, cyclopentyl and cyclohexyl. In some embodiments, cycloalkyl groups include 3 to 10 carbon atoms, for example, 3 to 6 carbon atoms.

As used herein, "heterocyclyl" means a nonaromatic cyclic ring system comprising at least one heteroatom in the ring system backbone. Heterocyclyls may include multiple fused rings. Heterocyclyls may be substituted or unsubstituted with one or more substituents. In some embodiments, heterocycles have 3-11 members. In six membered monocyclic heterocycles, the heteroatom(s) are selected from one to three of O, N or S, and wherein when the heterocycle is five membered, it can have one or two heteroatoms selected from O, N, or S. Examples of heterocyclyl include azirinyl, aziridinyl, azetidinyl, oxetanyl, thietanyl, 1,4,2-dithiazolyl, dihydropyridinyl, 1,3-dioxanyl, 1,4-dioxanyl, 1,3-dioxolanyl, morpholinyl, thiomorpholinyl, piperazinyl, pyranyl, pyrrolidinyl, tetrahydrofuryl, tetrahydropyridinyl, oxazinyl, thiazinyl, thiinyl, thiazolidinyl, isothiazolidinyl, oxazolidinyl, isoxazolidinyl, piperidinyl, pyrazolidinyl, imidazolidinyl and thiomorpholinyl.

As used herein, "aryl" means a mono-, bi-, tri- or polycyclic group with only carbon atoms present in the ring backbone having 5 to 14 ring atoms (preferably 5, 6, 9, or 10 ring atoms); and having 6, 10, or 14 pi electrons shared in a cyclic array; wherein at least one ring in the system is aromatic. Aryl groups can either be unsubstituted or substituted with one or more substituents. Examples of aryl include phenyl, naphthyl, tetrahydronaphthyl and biphenyl. In some embodiments, the aryl is phenyl.

As used herein, the term "heteroaryl" means a mono-, bi-, tri- or polycyclic group having 5 to 14 ring atoms, (preferably 5, 6, 9, or 10 ring atoms); and having 6, 10, or 14 pi electrons shared in a cyclic array; wherein at least one ring in the system is aromatic, and at least one ring in the system contains one or more heteroatoms independently selected from the group consisting of N, O, and S. Heteroaryl groups can either be unsubstituted or substituted with one or more substituents. Examples of heteroaryl include thienyl, pyridinyl, furyl, oxazolyl, oxadiazolyl, pyrrolyl, imidazolyl, triazolyl, thiodiazolyl, pyrazolyl, isoxazolyl, thiadiazolyl, pyranyl, pyrazinyl, pyrimidinyl, pyridazinyl, triazinyl, thiazolyl benzothienyl, benzoxadiazolyl, benzofuranyl, benzimidazolyl, benzotriazolyl, cinnolinyl, indazolyl, indolyl, isoquinolinyl, isothiazolyl, naphthyridinyl, purinyl, thienopyridinyl, pyrido[2,3-d]pyrimidinyl, pyrrolo[2,3-b]pyridinyl, quinazolinyl, quinolinyl, thieno[2,3-c]pyridinyl, pyrazolo[3,4-b]pyridinyl, pyrazolo[3,4-c]pyridinyl, pyrazolo[4,3-c]pyridine, pyrazolo[4,3-b]pyridinyl, tetrazolyl, chromane, 2,3-dihydrobenzo[b][1,4]dioxine, benzo[d][1,3]dioxole, 2,3-dihydrobenzofuran, tetrahydroquinoline, 2,3-dihydrobenzo[b][1,4]oxathiine, and others. In some embodiments, the heteroaryl is selected from thienyl, pyridinyl, furyl, pyrazolyl, imidazolyl, pyranyl, pyrazinyl, and pyrimidinyl.

As used herein, "halo", "halide" or "halogen" is a chloro, bromo, fluoro, or iodo radical. In some embodiments, a halo is a chloro, bromo or fluoro. For example, a halide can be fluoro.

The term "substituted" refers to moieties having substituents replacing a hydrogen atom on one or more non-hydrogen atoms of the molecule. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. Substituents can include, for example, —($C_{1-8}$ alkyl) optionally substituted with one or more of hydroxyl, —$NH_2$, —NH($C_{1-3}$ alkyl), and —N($C_{1-3}$ alkyl)$_2$; —($C_{1-9}$ haloalkyl); a halide; a hydroxyl; a carbonyl [such as —C(O)OR, and —C(O)R]; a thiocarbonyl [such as —C(S)OR, —C(O)SR, and —C(S)R]; —($C_{1-8}$ alkoxyl) optionally substituted with one or more of halide, hydroxyl, —$NH_2$, —NH($C_{1-3}$ alkyl), and —N($C_{1-3}$ alkyl)$_2$; —OPO(OH)$_2$; a phosphonate [such as —PO(OH)$_2$ and —PO(OR')$_2$]; —OPO(OR')R"; —NRR'; —C(O)NRR'; —C(NR)NR'R"; —C(NR')R"; a cyano; a nitro; an azido; —SH; —S—R; —OSO$_2$(OR); a sulfonate [such as —SO$_2$(OH) and —SO$_2$(OR)]; —SO$_2$NR'R"; and —SO$_2$R; in which each occurrence of R, R' and R" are independently selected from H and —$(C_{1-8}$ alkyl).

Composition

In one aspect of the invention, there is provided a composition comprising:
  a bulk material; and
  at least one surface;
  the bulk material comprising ions of a metal M bonded to one another via linker groups;
  the surface comprising ions of a metal M' bonded to one another via linker groups;
  the metals M and M' being the same or different;
  the surface comprising at least one first site A and at least one second, different site B;
  the site A having a hydroxyl group bonded thereto, said site A optionally being capable of interacting with $CO_2$;
  the site B being a Lewis acidic site capable of binding a $CO_2$ molecule;
  wherein the distance d between the site A and site B is such that a monomer molecule Y and the bound $CO_2$ can react together on the surface to form a polymer in which $CO_2$ is incorporated into the structure of the polymer.

In one aspect of the invention, there is provided a composition comprising:
  a bulk material; and
  at least one surface;
  the bulk material comprising ions of a metal M bonded to one another via linker groups;
  the surface comprising ions of a metal M' bonded to one another via linker groups;
  the metals M and M' being the same or different;
  the surface comprising at least one first site A and at least one second, different site B;
  the site A having a hydroxyl group bonded thereto, said site A being capable of interacting with a monomer molecule;
  the site B being a Lewis acidic site, said site B being capable of interacting with a monomer molecule;
  the composition being obtainable by reacting a source of metal ions M and M' with a source of linker groups and a source of hydroxyl groups in the presence of a modulator, under conditions such that the surface of the composition has first sites A to which the hydroxyl groups are bound, and second sites B which are Lewis acidic.

In one aspect of the invention, there is provided a crystallite composition comprising:
  a bulk material; and
  at least one surface;
  the bulk material comprising ions of a metal M bonded to one another via linker groups;
  the surface comprising ions of a metal M' bonded to one another via linker groups;
  the metals M and M' being the same or different;
  the surface comprising at least one first site A and at least one second, different site B;
  the site A having a hydroxyl group bonded thereto, said site A being capable of interacting with a monomer molecule;
  the site B being a Lewis acidic site, said site B being capable of interacting with a monomer molecule.

In one embodiment, the composition of the present invention is a crystallite composition (as defined herein). In contrast to the compositions produced using the methods of the prior art, which produce particles in the form of agglomerates comprising a collection of crystallites, the use of a modulator according to the method of the invention enables the production of the composition in the form of individual, single crystals with control over crystallite size and particle morphology.

In one embodiment, the average size of the crystallites is between 1 and 100 nm. In one embodiment, the average size of the crystallites is between 10 and 80 nm.

The composition of the invention comprises a bulk material. Typically, the bulk material comprises ions of a metal M bonded to one another via linker groups, thus forming a framework or scaffold.

The metal M may be any metal capable of forming ions to which a linker group may coordinate to form the bulk material. Examples of such metals include: transition metals, including first row transition metals such as Sc, Ti, V, Cr, Mn, Fe, Co, Ni, Cu and Zn; second row transition metals such as Y, Zr, Nb, Mo, Tc, Ru, Rh, Pd, Ag and Cd; third row transition metals such as Hf, Ta, W, Re, Os, Ir, Pt, Au and Hg; lanthanides such as La, Ce, Pr, Nd, Pm, Sm, Eu, Gd, Tb, Dy, Ho, Er, Tm, Yb and Lu; and p-block metals such as Al, Ga, Ge, In, Sn, Tl, Pb and Bi.

The metal ions M which coordinate with the linker groups to form the bulk material may be the same or different. In one embodiment, the bulk material comprises ions of only one metal M. In another embodiment, the bulk material comprises ions of a mixture of more than one (preferably 2 to 4, more preferably 2 or 3, most preferably 2) different metals M.

In use in a polymerisation reaction which involves $CO_2$ incorporation, as described in more detail below, the function of the hydroxyl group on the surface of the catalyst is to interact with the monomer molecule Y, or the molecule Y', to which $CO_2$ is incorporated in the final product. In particular, when the molecule Y or Y' is an epoxide, the —OH group on the surface of the composition of the invention facilitates ring-opening of the epoxide group to enable it to react with $CO_2$ on the surface of the catalyst. In addition, the site A is optionally capable of interacting with $CO_2$. The surface of the composition of the invention is provided with a sufficient number of hydroxyl groups in sufficient proximity to the B-sites on the surface to enhance the activity of the catalyst towards the copolymerisation, or cyclic carbonate formation, reactions.

The site B is a Lewis acidic site. In this specification "Lewis acid" takes its normal meaning in the art of an electron pair acceptor. Depending on the intended use of the composition, the Lewis acidic site B may be vacant (unoccupied) or may have a Lewis base bound thereto.

In one embodiment, the site B is capable of interacting with a monomer molecule. In one embodiment, the site B is capable of interacting with $CO_2$. In one embodiment, the site B is capable of interacting both with a monomer molecule and with $CO_2$.

In one embodiment, the Lewis acidic site B is unoccupied. In this embodiment the metal ion is therefore coordinatively unsaturated. By "coordinatively unsaturated" is meant that not all of the usual coordination sites of the metal ion are occupied. Typically, 1, 2 or 3, in one embodiment 1 or 2, in one embodiment 1 coordination site is unoccupied. By way of example, in the particularly preferred case of the compounds having the general formula $[Sc_3O(OH)(BTC)_2]$, the $Sc^{3+}$ ion having a site B on the surface is 5-coordinated rather than the usual 6.

In use in a polymerisation reaction which involves $CO_2$ incorporation, as described in more detail below, the function of the unoccupied Lewis acidic site B is to bind a $CO_2$ molecule such that the bound $CO_2$ molecule interacts with the monomer molecule Y, to form a polymer in which the bound $CO_2$ is incorporated in the structure of the polymer. The Lewis acid facilitates high availability of $CO_2$ for activation and subsequent insertion into the polymer product. In particular, when the molecule Y is an epoxide, the presence of the unoccupied Lewis acidic site on the surface of the composition of the invention facilitates reaction of the bound $CO_2$ with the ring-opened epoxide group on the surface of the catalyst.

In one embodiment, the Lewis acidic site B has a Lewis base bound thereto. The term "Lewis base" has its normal meaning in the art of any compound having at least one (such as one, two or three) Lewis base, i.e. electron pair donating, groups. The Lewis basic groups are well known to those in the art, and include oxygen-based electron pair donors such as —OH and —OR, amino groups such as —$NH_2$, —$NH(C_{1-6}$ alkyl) and —$N(C_{1-6}$ alkyl)$_2$. Examples of Lewis bases include alcohols such as $C_{1-6}$ alcohols, including diols, especially $C_{2-6}$ alkylenediols such as ethylene glycol and propylene glycol; amines such as ($C_{1-6}$ alkyl)amines, di($C_{1-6}$ alkyl)amines, and $C_{2-6}$ alkylenediamines such as ethylenediamine; $C_{2-6}$ alkylene amino alcohols such as ethanolamine, and heterocyclyl and heteroaryl groups, as defined and exemplified above (e.g. piperazine or imidazole).

In use, as described in more detail below, the function of the Lewis acidic site B having a Lewis base bound thereto is to interact with a $CO_2$ molecule in a manner such that reaction of the $CO_2$ molecule with the molecule Y' is facilitated, to form a molecule in which the $CO_2$ is incorporated into the structure of the molecule. In particular, when the molecule Y' is an epoxide, the presence of the bound Lewis acidic B-site on the surface of the composition of the invention facilitates reaction of the $CO_2$ bound to the A-site with the ring-opened epoxide group on the surface of the catalyst so as to form a cyclic carbonate.

FIG. 1 illustrates the general structure of the bulk material and surface structure of a composition according to one embodiment of the invention. In this embodiment, the metal ions M and M' are linked by trivalent linkers. The surface metal ions M' are labelled A and B to illustrate the difference between the sites. In this embodiment, the Lewis acid sites B are unoccupied. The distance d between the A and B sites is important, as explained in more detail below. When used for catalysis of a polymerisation reaction wherein $CO_2$ is incorporated into the structure of the polymer wherein the proportions of the repeating unit including $CO_2$ incorporation (e.g. a carbonate repeating unit) are much greater than the repeating unit lacking $CO_2$ incorporation (e.g. an ether repeating unit).

Figure 2:
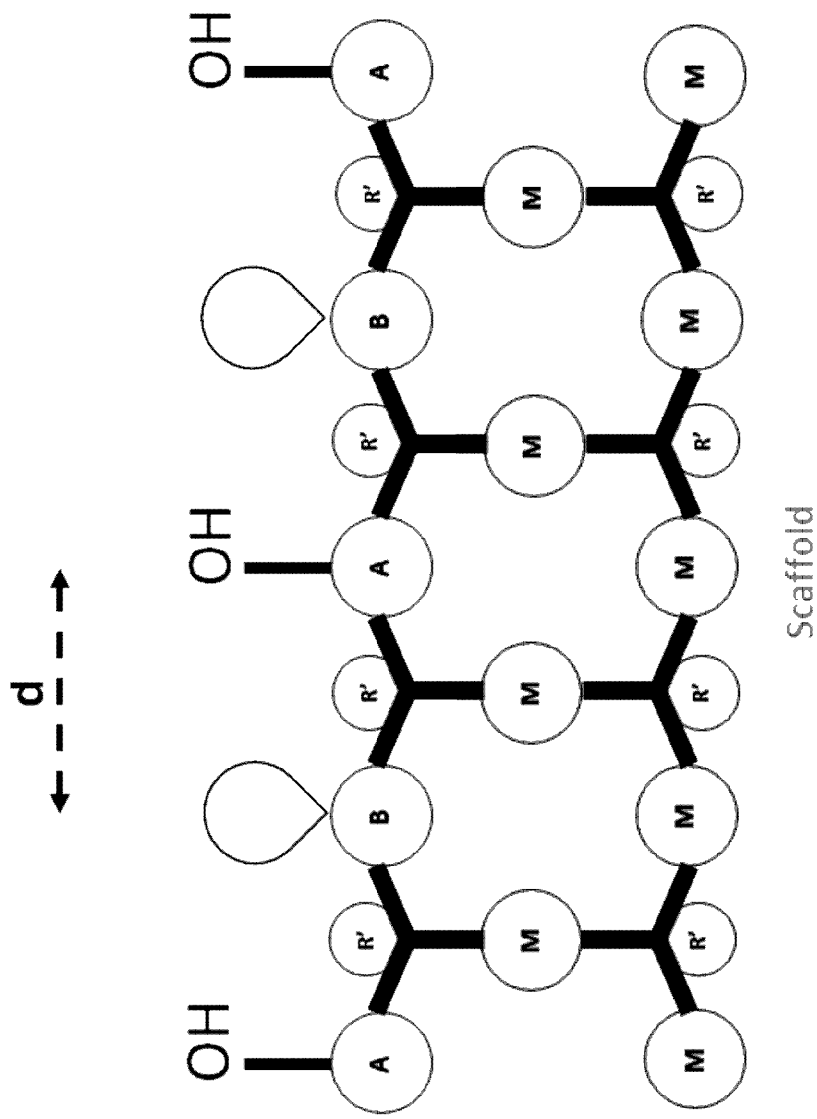
FIG. 2 illustrates the general structure of the bulk material and surface structure of a hybrid platform catalyst composition according to another embodiment of the invention, wherein the metal ions M and M' are linked by trivalent linkers and a non-coordinating group R' forms part of the linker group.

FIG. 2 illustrates the general structure of the bulk material and surface structure of a composition according to another embodiment of the invention. In this embodiment, the metal ions M and M' are linked by trivalent linkers. This differs from that as illustrated in FIG. 1 in that a non-coordinating group R' forms part of the linker group. While this maintains the distance d between the A and B sites, the attachment of the group R' enables the surface properties of the composition and its catalytic properties to be tuned to catalyse reactions having different results compared with that of FIG. 1, as explained in more detail below. For example, when used for catalysis of a polymerisation reaction wherein $CO_2$ is incorporated into the structure of the polymer wherein the proportions of the repeating unit including $CO_2$ incorporation (e.g. a carbonate repeating unit) are reduced in favour of the repeating unit lacking $CO_2$ incorporation (e.g. an ether repeating unit), compared with those of FIG. 1.

Figure 3:
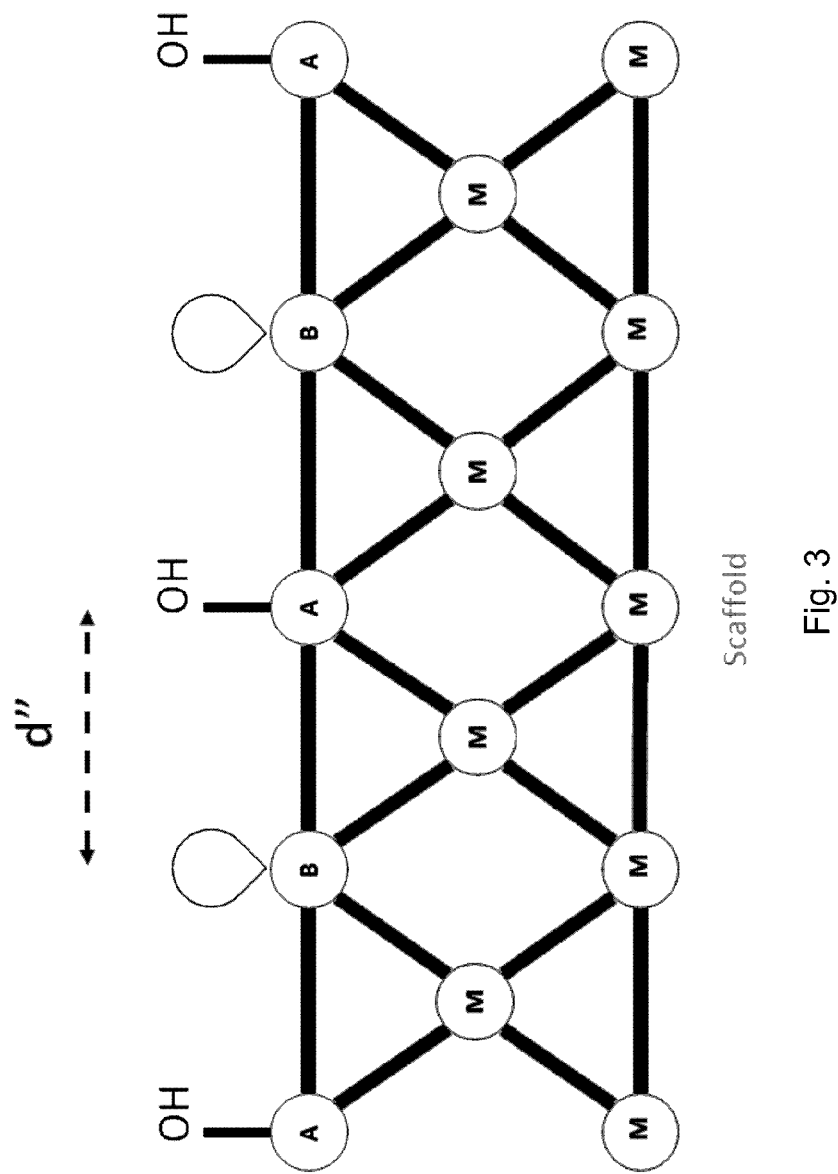
FIG. 3 illustrates the general structure of the bulk material and surface structure of a hybrid platform catalyst composition according to one embodiment of the invention, wherein the metal ions M and M' are linked by divalent linkers and showing unoccupied Lewis acid sites B.

FIG. 3 illustrates the general structure of the bulk material and surface structure of a composition according to one embodiment of the invention, wherein the metal ions M and M' are linked by divalent linkers and showing unoccupied Lewis acid sites B. In this embodiment, the distance d" between the A and B sites is greater. This general structure is generally less favoured for catalysis of a polymerisation reaction wherein $CO_2$ is incorporated into the structure of the polymer, as the resulting proportions of the repeating unit including $CO_2$ incorporation (e.g. a carbonate repeating unit) are much less than the repeating unit lacking $CO_2$ incorporation (e.g. an ether repeating unit).

On the surface of the composition of the present invention, the distance between sites A and B is important, as the sites must be sufficiently close together to allow, in use, the bound $CO_2$ molecule to interact with the molecule Y or Y' in which the $CO_2$ will be incorporated.

In one embodiment, the surface of the composition of the invention is configured such that the bound $CO_2$ can be incorporated into the structure of a polymer. In this embodiment, the distance (designated d in FIGS. 1 and 2) between the metal atom at site A, carrying the hydroxyl group, and the metal atom at site B is such that a monomer molecule Y (particularly although not exclusively an epoxide) and the bound $CO_2$ can react together on the surface to form a polymer in which $CO_2$ is incorporated into the structure of the polymer. The distance d may vary depending on the nature of the monomer Y, the linker group, and the metal ions M' on the surface. In one embodiment the distance d is between 0.3 and 1 nm.

The distance d between the metal atoms at sites A and B may be measured by a number of techniques known to those skilled in the art.

In one embodiment, the distance d may be calculated based on solid-state NMR measurements, for example using the methods and chemical shift standards described in S. Hayashi and K. Hayamizu, *Bull. Chem. Soc. Jpn.,* 1991, 64, 685-687.

In one embodiment, the distance d may be determined based on crystallographic data by means of a suitable computational method. As is known to those skilled in the art, suitable crystallographic methods for obtaining the data include X-ray crystallography. One such suitable X-ray crystallographic method is powder diffraction (PDF) analysis. One specific method for carrying out PDF analysis is shown below.

In this specific example, the PDF analysis was carried out on a Rigaku R-Axis 3-circle Spider goniometer equipped with a curved Fujifilm® image plate mounted at the window of a graphite monochromated sealed tube silver (Ag Ka1/Ka2=0.56094 Å) generator operating at 1.2 kW (40 kV, 30 mA). A borosilicate capillary of diameter 1 mm with a 0.01 mm wall thickness was used. A fixed capillary to detector distance of 127.4 mm and an exposure time of 84 s per degree ω of oscillation. An oscillation ω of 840 was used, giving a total collection time of 117.6 minutes. The collected 2D powder pattern was integrated to a 1 D total scattering pattern using Rigaku 2DP software and transformed to a pair distribution function utilising GudrunX. This is described in more detail in Billinge, S. J. L. *Z. Für Krist.—Cryst. Mater.* 2004, 219 (3), 117-121, and in Egami, T. and Billinge, S. J. L. *Underneath the Bragg Peaks: Structural Analysis of Complex Materials,* Second edition; Pergamon Materials Series; Elsevier: Amsterdam, 2012.

Once the crystallographic data has been obtained, the distance d can be obtained from these data using a suitable computational method. One example of such a computational method uses density functional theory (DFT). As is known to the person skilled in the art, in the context of computational materials science, ab initio (from first principles) DFT calculations allow the prediction and calculation of material behaviour on the basis of quantum mechanical considerations, without requiring higher-order parameters such as fundamental material properties. In contemporary DFT techniques, the electronic structure is evaluated using a potential acting on the system's electrons. This DFT potential is constructed as the sum of external potentials $V_{ext}$, which is determined solely by the structure and the elemental composition of the system, and an effective potential $V_{eff}$ which represents interelectronic interactions. Thus, a problem for a representative supercell of a material with n electrons can be studied as a set of n one-electron Schrödinger-like equations, which are also known as Kohn-Sham equations, as described, for example, in Hanaor, D. et al. *Computational Mechanics*. 2012 50 (2): 185-194.

By way of example, the interatomic distances may be calculated using a Gaussian16 program at the density functional theory (DFT) level with the hybrid functionals B3LYP, as described in M. J. Frisch, et al., *Gaussian 16 Rev. B*.01, Wallingford, C T, 2016, and in A. D. Becke, *J. Chem. Phys.*, 1993, 98, 5648-5652. For light atoms, the Dunning's correlated-consistent cc-pVDZ basis set may be used. Metal atoms may be described by effective core potentials and related basis set, as described in P. J. Hay and W. R. Wadt, *J. Chem. Phys.*, 1985, 82, 299-310. Dispersion energies were included in all the calculations with the atom-atom semi-empirical method and parameters proposed by Grimme et al., *J. Chem. Phys.*, 2010, 132, 154104. When computing coordination energies, Boys' counterpoise correction was applied to compensate the basis set superposition error (BSSE).

Figure 17:
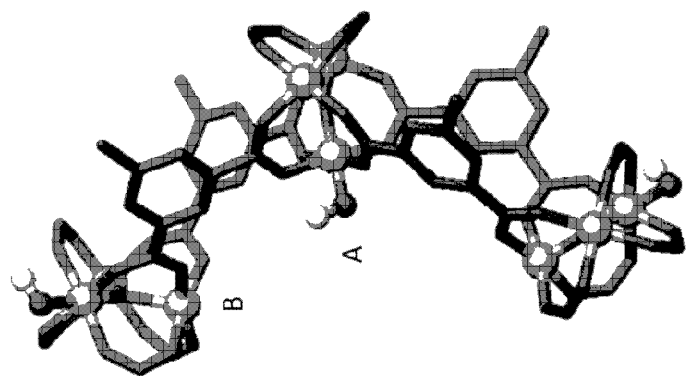
FIG. 17 shows a computational model of a composition according to the invention, showing an A-site to which a hydroxyl group is bound and a B-site having one coordination site vacant.

FIG. 17 shows by means of a computational model the molecular structure of a composition according to the invention, showing an A-site having a hydroxyl group bound thereto, and a B-site where one coordination site is vacant. The distance d between the A-site and the B-site may be calculate using the methods described generally and specifically above.

In one embodiment, the surface of the composition of the invention is configured such that the bound $CO_2$ can be incorporated into the structure of a cyclic carbonate. In this embodiment, the distance d' between the site A and site B is such that the molecule Y' and the bound $CO_2$ can react together on the surface to form the cyclic carbonate. The distance d' may vary depending on the nature of the monomer Y', the linker group, and the metal ions M' on the surface, but is generally longer than the distance d for catalysts configured for facilitating a reaction between a monomer molecule Y (particularly although not exclusively an epoxide) and the bound $CO_2$ to form a polymer in which $CO_2$ is incorporated into the structure of the polymer. In one embodiment the distance d' is between 0.3 and 1.3 nm.

Figure 4:
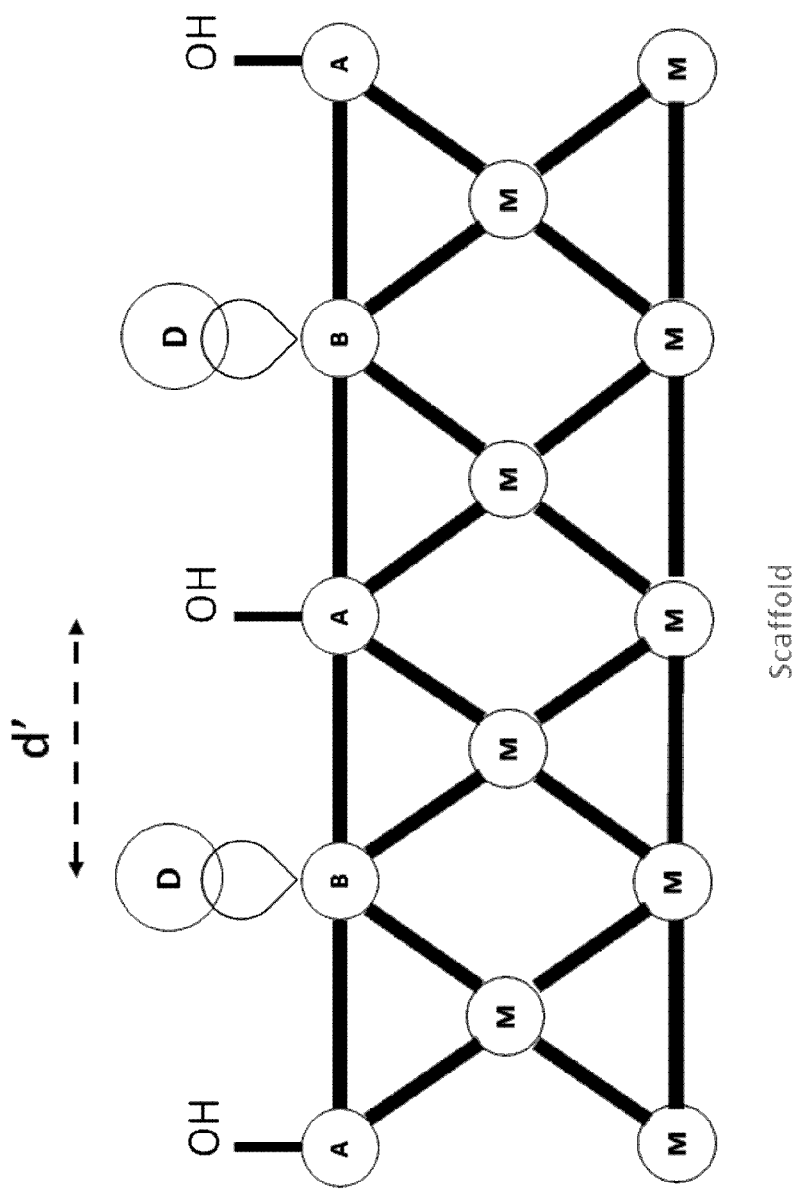
FIG. 4 illustrates the general structure of the bulk material and surface structure of a hybrid platform catalyst composition according to one embodiment of the invention, wherein the metal ions M and M' are linked by divalent linkers and showing wherein the Lewis acid sites B are bound to a divalent Lewis base D.

FIG. 4 illustrates the general structure of the bulk material and surface structure of a composition according to this embodiment of the invention, wherein the metal ions M and M' are linked by divalent linkers and showing Lewis acid sites B to which a Lewis base D is bound. In this embodiment, the distance d' between the A and B sites is greater than the distance d in FIGS. 1 and 2. However, the presence of the Lewis base D allows interaction with the $CO_2$ so as to facilitate the reaction with the molecule Y'. This allows the problem of the distance in FIG. 3 between the A and B sites to be overcome, such that the composition can be used as a catalyst to catalyse a reaction between an epoxide and $CO_2$ to produce a cyclic carbonate wherein $CO_2$ is incorporated into the structure of the cyclic carbonate.

Method of Producing the Composition

The invention also provides methods for producing the composition of the invention. Typically, such methods comprise reacting a source of metal ions M and M' with a source of linker groups and a source of hydroxyl groups, and a modulator, and subjecting the composition to conditions such that the surface of the composition has first sites A to which the hydroxyl groups are bound, and second sites B which are Lewis acidic.

The source of metal ions M and M' may be any substance capable of producing the metals M and M' in the requisite ionic form. Typically, these comprise metal salts in which the metal is in ionic form with a suitable counter-ion, examples of which include halide (fluoride, chloride, bromide, iodide), hydroxide, alkoxide, sulfate, nitrate, phosphate, alkylsulfonate, arylsulfonate, alkylphosphonate, arylphosphonate (the alkyl and aryl parts of these counter-ions being as defined and exemplified above).

The source of linker groups may be any substance capable of producing the linker groups in a form capable of coordinating to the metal ion. In one embodiment, the source of linker groups comprises a compound which is a conjugate acid of the linker group as present in the final composition, such that the linker group which is coordinated to the metal ion is its conjugate base (i.e. it differs from the compound which is the source of the linker group by at least 1, preferably 1, 2, or 3, protons). Typically, in this embodiment, the source of linker groups is an organic acid, such as a carboxylic acid. In one embodiment the source of linker groups is a dicarboxylic acid. In one embodiment the source of linker groups is a tricarboxylic acid.

The source of hydroxyl groups may be any compound capable of reacting so as to produce a composition wherein hydroxyl groups are present at the sites A on the surface of the composition. Examples of such sources include water.

In one embodiment, a modulator is added to the composition. According to the present invention, the addition of the modulator to the reaction mixture facilitates formation of compositions having the surface properties described herein which makes the compositions particularly active as catalysts, especially for catalysing reactions in which $CO_2$ is incorporated into a molecular structure. Without wishing to be bound by theory, it is believed that the modulator binding to the metal salts used in the synthesis and compete with the linker during formation of the composition.

In one embodiment, the metal ions M and M' are the same and a modulator is added to the composition. In one embodiment, the metal ions M and M' are both $Sc^{3+}$ and a modulator is added to the composition.

In one embodiment, no modulator is added to the composition. In one embodiment, the metal ions M and M' are different and no modulator is added to the composition.

In one embodiment, the stoichiometric ratio of the source of metal ions to the modulator is between 1:0.001 and 1:1000. In one embodiment, the stoichiometric ratio of the source of metal ions to the modulator is between 1:0.1 and 1:500. In one embodiment, the stoichiometric ratio of the source of metal ions to the modulator is between 1:0.2 and 1:250. In one embodiment, the stoichiometric ratio of the source of metal ions to the modulator is between 1:0.4 and 1:150.

The modulator may be any small molecule capable of binding to a metal ion while being easily removable from the final composition (e.g. by washing) such that it is present in only small amounts in, or is absent from, the final composition. In one embodiment, the modulator has a molecular weight which is lower than the molecular weight of the source of linker groups.

Typical possible modulators include organic acids (including but not limited to carboxylic acids, phosphonic acids, phosphoric acids, phosphinic acids, sulfonic acids, sulfinic acids, sulfenic acids), alcohols and amines.

In one embodiment, the modulator is an aliphatic compound having a total of 1 to 20 carbon atoms. In one embodiment, the modulator is an aliphatic compound having a total of 1 to 10 carbon atoms. In one embodiment, the modulator is an aliphatic compound having a total of 1 to 8 carbon atoms. In one embodiment, the modulator is an aliphatic compound having a total of 1 to 6 carbon atoms. In one embodiment, the modulator is an aliphatic compound having a total of 1 to 4 carbon atoms. In one embodiment, the modulator is an aliphatic compound having a total of 1 to 3 carbon atoms. In one embodiment, the modulator is an aliphatic compound having a total of 2 carbon atoms.

In one embodiment, the modulator is an aromatic compound having a total of 6 to 20 carbon atoms. In one embodiment, the modulator is an aromatic compound having a total of 6 to 10 carbon atoms. In one embodiment, the modulator is an aromatic compound having a total of 6 to 8 carbon atoms. The aryl moiety of the aromatic compound may be substituted as defined and exemplified above for aryl groups.

In one embodiment, the modulator is an organic acid. In one embodiment, the modulator is added to the composition as the free acid. In another embodiment, the modulator is generated in situ by reaction of the conjugate base of the acid with a stronger acid. In another embodiment, the modulator is generated in situ by reduction of the corresponding peroxy acid (i.e. an organic acid where at least one of the hydroxyl moieties of the acid functional group is replaced by a group —O—O—H), with a suitable reducing agent.

In one embodiment, the modulator is a carboxylic acid. In one embodiment, the modulator is a carboxylic acid having a total of 1 to 20 carbon atoms. In one embodiment, the modulator is an aliphatic carboxylic acid having 1 to 20 carbon atoms, which may be substituted by one or more halogen atoms. In one embodiment, the modulator is a carboxylic acid having a total of 1 to 10 carbon atoms. In one embodiment, the modulator is an aliphatic carboxylic acid having 1 to 10 carbon atoms, which may be substituted by one or more halogen atoms. In one embodiment, the modulator is an aliphatic carboxylic acid having a total of 1 to 8 carbon atoms, which may be substituted by one or more halogen atoms. In one embodiment, the modulator is an aliphatic carboxylic acid having a total of 1 to 6 carbon atoms, which may be substituted by one or more halogen atoms. In one embodiment, the modulator is an aliphatic carboxylic acid having a total of 1 to 4 carbon atoms, which may be substituted by one or more halogen atoms. In one embodiment, the modulator is an aliphatic carboxylic acid having a total of 2 to 4 carbon atoms, which may be substituted by 1 to 7 halogen atoms. In one embodiment, the modulator is an aliphatic carboxylic acid having 1 to 3 carbon atoms, which may be substituted by one or more halogen atoms. In one embodiment, the modulator is an aliphatic carboxylic acid having 2 or 3 carbon atoms, which may be substituted by 1 to 5 halogen atoms. In one embodiment, the modulator is an aliphatic carboxylic acid having 2 carbon atoms, which may be substituted by one or more halogen atoms. In one embodiment, the modulator is an aliphatic carboxylic acid having 2 carbon atoms, which may be substituted by 1, 2 or 3 halogen atoms. In these embodiments, the halogen atoms may be the same or different. Preferably the halogen atoms are selected from fluorine or chlorine. In one embodiment, the modulator is selected from the group consisting of trifluoroacetic acid, trichloroacetic acid and acetic acid.

In another embodiment, the modulator is an aromatic carboxylic acid having a total of 6 to 20 carbon atoms. In another embodiment, the modulator is an aromatic carboxylic acid having a total of 6 to 10 carbon atoms. In one embodiment, the modulator is an aromatic carboxylic acid having a total of 6 to 8 carbon atoms. The aryl moiety of the aromatic compound may be substituted as defined and exemplified above for aryl groups. In one embodiment, the modulator is benzoic acid.

In one embodiment, the modulator is a sulfonic acid. In one embodiment, the modulator is a sulfonic acid having a total of 1 to 20 carbon atoms. In one embodiment, the modulator is an aliphatic sulfonic acid having 1 to 20 carbon atoms, which may be substituted by one or more halogen atoms. In one embodiment, the modulator is a sulfonic acid having a total of 1 to 10 carbon atoms. In one embodiment, the modulator is an aliphatic sulfonic acid having 1 to 10 carbon atoms, which may be substituted by one or more halogen atoms. In one embodiment, the modulator is an aliphatic sulfonic acid having a total of 1 to 8 carbon atoms, which may be substituted by one or more halogen atoms. In one embodiment, the modulator is an aliphatic sulfonic acid having a total of 1 to 6 carbon atoms, which may be substituted by one or more halogen atoms. In one embodiment, the modulator is an aliphatic sulfonic acid having a total of 1 to 4 carbon atoms, which may be substituted by one or more halogen atoms. In one embodiment, the modulator is an aliphatic sulfonic acid having 1 to 3 carbon atoms, which may be substituted by one or more halogen atoms. In one embodiment, the modulator is an aliphatic sulfonic acid having 2 carbon atoms, which may be substituted by one or more halogen atoms.

In another embodiment, the modulator is an aromatic sulfonic acid having a total of 6 to 20 carbon atoms. In another embodiment, the modulator is an aromatic sulfonic acid having a total of 6 to 10 carbon atoms. In one embodiment, the modulator is an aromatic sulfonic acid having a total of 6 to 8 carbon atoms. The aryl moiety of the aromatic compound may be substituted as defined and exemplified above for aryl groups.

In one embodiment, the modulator is a sulfinic acid. In one embodiment, the modulator is a sulfinic acid having a total of 1 to 20 carbon atoms. In one embodiment, the modulator is an aliphatic sulfinic acid having 1 to 20 carbon atoms, which may be substituted by one or more halogen atoms. In one embodiment, the modulator is a sulfinic acid having a total of 1 to 10 carbon atoms. In one embodiment, the modulator is an aliphatic sulfinic acid having 1 to 10 carbon atoms, which may be substituted by one or more halogen atoms. In one embodiment, the modulator is an aliphatic sulfinic acid having a total of 1 to 8 carbon atoms, which may be substituted by one or more halogen atoms. In one embodiment, the modulator is an aliphatic sulfinic acid having a total of 1 to 6 carbon atoms, which may be substituted by one or more halogen atoms. In one embodiment, the modulator is an aliphatic sulfinic acid having a total of 1 to 4 carbon atoms, which may be substituted by one or more halogen atoms. In one embodiment, the modulator is an aliphatic sulfinic acid having 1 to 3 carbon atoms, which may be substituted by one or more halogen atoms. In one embodiment, the modulator is an aliphatic sulfinic acid having 2 carbon atoms, which may be substituted by one or more halogen atoms.

In another embodiment, the modulator is an aromatic sulfinic acid having a total of 6 to 20 carbon atoms. In another embodiment, the modulator is an aromatic sulfinic acid having a total of 6 to 10 carbon atoms. In one embodiment, the modulator is an aromatic sulfinic acid having a total of 6 to 8 carbon atoms. The aryl moiety of the aromatic compound may be substituted as defined and exemplified above for aryl groups.

In one embodiment, the modulator is a sulfenic acid. In one embodiment, the modulator is a sulfenic acid having a total of 1 to 20 carbon atoms. In one embodiment, the modulator is an aliphatic sulfenic acid having 1 to 20 carbon atoms, which may be substituted by one or more halogen atoms. In one embodiment, the modulator is a sulfenic acid having a total of 1 to 10 carbon atoms. In one embodiment, the modulator is an aliphatic sulfenic acid having 1 to 10 carbon atoms, which may be substituted by one or more halogen atoms. In one embodiment, the modulator is an aliphatic sulfenic acid having a total of 1 to 8 carbon atoms, which may be substituted by one or more halogen atoms. In one embodiment, the modulator is an aliphatic sulfenic acid having a total of 1 to 6 carbon atoms, which may be substituted by one or more halogen atoms. In one embodiment, the modulator is an aliphatic sulfenic acid having a total of 1 to 4 carbon atoms, which may be substituted by one or more halogen atoms. In one embodiment, the modulator is an aliphatic sulfenic acid having 1 to 3 carbon atoms, which may be substituted by one or more halogen atoms. In one embodiment, the modulator is an aliphatic sulfenic acid having 2 carbon atoms, which may be substituted by one or more halogen atoms.

In another embodiment, the modulator is an aromatic sulfenic acid having a total of 6 to 20 carbon atoms. In another embodiment, the modulator is an aromatic sulfenic acid having a total of 6 to 10 carbon atoms. In one embodiment, the modulator is an aromatic sulfenic acid having a total of 6 to 8 carbon atoms. The aryl moiety of the aromatic compound may be substituted as defined and exemplified above for aryl groups.

In one embodiment, the modulator is a phosphonic acid. In one embodiment, the modulator is a phosphonic acid having a total of 1 to 20 carbon atoms. In one embodiment, the modulator is an aliphatic phosphonic acid having 1 to 20 carbon atoms, which may be substituted by one or more halogen atoms. In one embodiment, the modulator is a phosphonic acid having a total of 1 to 10 carbon atoms. In one embodiment, the modulator is an aliphatic phosphonic acid having 1 to 10 carbon atoms, which may be substituted by one or more halogen atoms. In one embodiment, the modulator is an aliphatic phosphonic acid having a total of 1 to 8 carbon atoms, which may be substituted by one or more halogen atoms. In one embodiment, the modulator is an aliphatic phosphonic acid having a total of 1 to 6 carbon atoms, which may be substituted by one or more halogen atoms. In one embodiment, the modulator is an aliphatic phosphonic acid having a total of 1 to 4 carbon atoms, which may be substituted by one or more halogen atoms. In one embodiment, the modulator is an aliphatic phosphonic acid having 1 to 3 carbon atoms, which may be substituted by one or more halogen atoms. In one embodiment, the modulator is an aliphatic phosphonic acid having 2 carbon atoms, which may be substituted by one or more halogen atoms.

In another embodiment, the modulator is an aromatic phosphonic acid having a total of 6 to 20 carbon atoms. In another embodiment, the modulator is an aromatic phosphonic acid having a total of 6 to 10 carbon atoms. In one embodiment, the modulator is an aromatic phosphonic acid having a total of 6 to 8 carbon atoms.

In one embodiment, the modulator is a phosphoric acid. In one embodiment, the modulator is a phosphoric acid having a total of 1 to 20 carbon atoms. In one embodiment, the modulator is an aliphatic phosphoric acid having 1 to 20 carbon atoms, which may be substituted by one or more halogen atoms. In one embodiment, the modulator is a phosphoric acid having a total of 1 to 10 carbon atoms. In one embodiment, the modulator is an aliphatic phosphoric acid having 1 to 10 carbon atoms, which may be substituted by one or more halogen atoms. In one embodiment, the modulator is an aliphatic phosphoric acid having a total of 1 to 8 carbon atoms, which may be substituted by one or more halogen atoms. In one embodiment, the modulator is an aliphatic phosphoric acid having a total of 1 to 6 carbon atoms, which may be substituted by one or more halogen atoms. In one embodiment, the modulator is an aliphatic phosphoric acid having a total of 1 to 4 carbon atoms, which may be substituted by one or more halogen atoms. In one embodiment, the modulator is an aliphatic phosphoric acid having 1 to 3 carbon atoms, which may be substituted by one or more halogen atoms. In one embodiment, the modulator is an aliphatic phosphoric acid having 2 carbon atoms, which may be substituted by one or more halogen atoms.

In another embodiment, the modulator is an aromatic phosphoric acid having a total of 6 to 20 carbon atoms. In another embodiment, the modulator is an aromatic phosphoric acid having a total of 6 to 10 carbon atoms. In one embodiment, the modulator is an aromatic phosphoric acid having a total of 6 to 8 carbon atoms. The aryl moiety of the aromatic compound may be substituted as defined and exemplified above for aryl groups.

In one embodiment, the modulator is a phosphinic acid. In one embodiment, the modulator is a phosphinic acid having a total of 1 to 20 carbon atoms. In one embodiment, the modulator is an aliphatic phosphinic acid having 1 to 20 carbon atoms, which may be substituted by one or more halogen atoms. In one embodiment, the modulator is a phosphinic acid having a total of 1 to 10 carbon atoms. In one embodiment, the modulator is an aliphatic phosphinic acid having 1 to 10 carbon atoms, which may be substituted by one or more halogen atoms. In one embodiment, the modulator is an aliphatic phosphinic acid having a total of 1 to 8 carbon atoms, which may be substituted by one or more halogen atoms. In one embodiment, the modulator is an aliphatic phosphinic acid having a total of 1 to 6 carbon atoms, which may be substituted by one or more halogen atoms. In one embodiment, the modulator is an aliphatic phosphinic acid having a total of 1 to 4 carbon atoms, which may be substituted by one or more halogen atoms. In one embodiment, the modulator is an aliphatic phosphinic acid having 1 to 3 carbon atoms, which may be substituted by one or more halogen atoms. In one embodiment, the modulator is an aliphatic phosphinic acid having 2 carbon atoms, which may be substituted by one or more halogen atoms.

In another embodiment, the modulator is an aromatic phosphinic acid having a total of 6 to 20 carbon atoms. In another embodiment, the modulator is an aromatic phosphinic acid having a total of 6 to 10 carbon atoms. In one embodiment, the modulator is an aromatic phosphinic acid having a total of 6 to 8 carbon atoms. The aryl moiety of the aromatic compound may be substituted as defined and exemplified above for aryl groups.

In one embodiment, the modulator is an alcohol. In one embodiment, the modulator is an aliphatic alcohol having a total of 1 to 20 carbon atoms. In one embodiment, the modulator is an aliphatic alcohol having a total of 1 to 10 carbon atoms. In one embodiment, the modulator is an aliphatic alcohol having a total of 1 to 8 carbon atoms. In one embodiment, the modulator is an aliphatic alcohol having a total of 1 to 6 carbon atoms. In one embodiment, the modulator is an aliphatic alcohol having a total of 1 to 4 carbon atoms. In one embodiment, the modulator is an aliphatic alcohol having a total of 1 to 3 carbon atoms. In one embodiment, the modulator is an aliphatic alcohol having a total of 2 carbon atoms.

In another embodiment, the modulator is an aromatic alcohol having a total of 6 to 20 carbon atoms. In another embodiment, the modulator is an aromatic alcohol having a total of 6 to 10 carbon atoms. In one embodiment, the modulator is an aromatic alcohol having a total of 6 to 8 carbon atoms.

In one embodiment, the modulator is an amine. In one embodiment, the modulator is an aliphatic amine having a total of 1 to 20 carbon atoms. In one embodiment, the modulator is an aliphatic amine having a total of 1 to 10 carbon atoms. In one embodiment, the modulator is an aliphatic amine having a total of 1 to 8 carbon atoms. In one embodiment, the modulator is an aliphatic amine having a total of 1 to 6 carbon atoms. In one embodiment, the modulator is an aliphatic amine having a total of 1 to 4 carbon atoms. In one embodiment, the modulator is an aliphatic amine having a total of 1 to 3 carbon atoms. In one embodiment, the modulator is an aliphatic amine having a total of 2 carbon atoms.

In another embodiment, the modulator is an aromatic amine having a total of 6 to 20 carbon atoms. In another embodiment, the modulator is an aromatic amine having a total of 6 to 10 carbon atoms. In one embodiment, the modulator is an aromatic amine having a total of 6 to 8 carbon atoms.

In one embodiment, the modulator is selected from the group consisting of trifluoroacetic acid, trichloroacetic acid, acetic acid and benzoic acid. In one embodiment, the modulator is trifluoroacetic acid. In one embodiment, the modulator is trichloroacetic acid. In one embodiment, the modulator is acetic acid. In one embodiment, the modulator is benzoic acid.

In one embodiment, the stoichiometric ratio of the modulator to the source of linker groups is between 50:1 and 1:5. In one embodiment, the stoichiometric ratio of the modulator to the source of linker groups is between 20:1 and 1:2.

In one embodiment, the stoichiometric ratio of the modulator to the source of linker groups is between 15:1 and 5:1. In one embodiment, the stoichiometric ratio of the modulator to the source of linker groups is between 12:1 and 8:1. In one embodiment, the stoichiometric ratio of the modulator to the source of linker groups is between 11:1 and 9:1. In one embodiment, the stoichiometric ratio of the modulator to the source of linker groups is 10:1.

In one embodiment, the stoichiometric ratio of the modulator to the source of linker groups is between 2:1 and 1:2. In one embodiment, the stoichiometric ratio of the modulator to the source of linker groups is between 1.5:1 and 1:1.5. In one embodiment, the stoichiometric ratio of the modulator to the source of linker groups is between 1.2:1 and 1:1.2. In one embodiment, the stoichiometric ratio of the modulator to the source of linker groups is 1:1.

In one embodiment, the source of linker groups is benzene-1,3,5-tricarboxylic acid and the stoichiometric ratio of the modulator to benzene-1,3,5-tricarboxylic acid is between 15:1 and 5:1. In one embodiment, the source of linker groups is benzene-1,3,5-tricarboxylic acid and the stoichiometric ratio of the modulator to benzene-1,3,5-tricarboxylic acid is between 12:1 and 8:1. In one embodiment, the source of linker groups is benzene-1,3,5-tricarboxylic acid and the stoichiometric ratio of the modulator to benzene-1,3,5-tricarboxylic acid is between 11:1 and 9:1. In one embodiment, the source of linker groups is benzene-1,3,5-tricarboxylic acid and the stoichiometric ratio of the modulator to benzene-1,3,5-tricarboxylic acid is 10:1.

In one embodiment, the source of linker groups is benzene-1,3,5-tricarboxylic acid and the stoichiometric ratio of the modulator to benzene-1,3,5-tricarboxylic acid is between 2:1 and 1:2. In one embodiment, the source of linker groups is benzene-1,3,5-tricarboxylic acid and the stoichiometric ratio of the modulator to benzene-1,3,5-tricarboxylic acid is between 1.5:1 and 1:1.5. In one embodiment, the source of linker groups is benzene-1,3,5-tricarboxylic acid and the stoichiometric ratio of the modulator to benzene-1,3,5-tricarboxylic acid is between 1.2:1 and 1:1.2. In one embodiment, the source of linker groups is benzene-1,3,5-tricarboxylic acid and the stoichiometric ratio of the modulator to benzene-1,3,5-tricarboxylic acid is 1:1.

In one embodiment, the source of linker groups is benzene-1,3,5-tricarboxylic acid, the modulator is benzoic acid and the stoichiometric ratio of benzoic acid to benzene-1,3,5-tricarboxylic acid is between 15:1 and 5:1. In one embodiment, the source of linker groups is benzene-1,3,5-tricarboxylic acid and the modulator is benzoic acid and the stoichiometric ratio of benzoic acid to benzene-1,3,5-tricarboxylic acid is between 12:1 and 8:1. In one embodiment, the source of linker groups is benzene-1,3,5-tricarboxylic acid, the modulator is benzoic acid and the stoichiometric ratio of benzoic acid to benzene-1,3,5-tricarboxylic acid is between 11:1 and 9:1. In one embodiment, the source of linker groups is benzene-1,3,5-tricarboxylic acid the modulator is benzoic acid and the stoichiometric ratio of benzoic acid to benzene-1,3,5-tricarboxylic acid is 10:1.

In one embodiment, the source of linker groups is benzene-1,3,5-tricarboxylic acid, the modulator is trichloroacetic acid and the stoichiometric ratio of trichloroacetic acid to benzene-1,3,5-tricarboxylic acid is between 15:1 and 5:1. In one embodiment, the source of linker groups is benzene-1,3,5-tricarboxylic acid, the modulator is trichloroacetic acid and the stoichiometric ratio of trichloroacetic acid to benzene-1,3,5-tricarboxylic acid is between 12:1 and 8:1. In one embodiment, the source of linker groups is benzene-1,3,5-tricarboxylic acid, the modulator is trichloroacetic acid and the stoichiometric ratio of trichloroacetic acid to benzene-1,3,5-tricarboxylic acid is between 11:1 and 9:1. In one embodiment, the source of linker groups is benzene-1,3,5-tricarboxylic acid the modulator is trichloroacetic acid and the stoichiometric ratio of trichloroacetic acid to benzene-1,3,5-tricarboxylic acid is 10:1.

In one embodiment, the source of linker groups is benzene-1,3,5-tricarboxylic acid and the stoichiometric ratio of the modulator to benzene-1,3,5-tricarboxylic acid is between 2:1 and 1:2. In one embodiment, the source of linker groups is benzene-1,3,5-tricarboxylic acid and the stoichiometric ratio of the modulator to benzene-1,3,5-tricarboxylic acid is between 1.5:1 and 1:1.5. In one embodiment, the source of linker groups is benzene-1,3,5-tricarboxylic acid and the stoichiometric ratio of the modulator to benzene-1,3,5-tricarboxylic acid is between 1.2:1 and 1:1.2. In one embodiment, the source of linker groups is benzene- 1,3,5-tricarboxylic acid and the stoichiometric ratio of the modulator to benzene-1,3,5-tricarboxylic acid is 1:1.

In one embodiment, the source of linker groups is benzene-1,3,5-tricarboxylic acid, the modulator is trifluoroacetic acid and the stoichiometric ratio of trifluoroacetic acid to benzene-1,3,5-tricarboxylic acid is between 2:1 and 1:2. In one embodiment, the source of linker groups is benzene-1,3,5-tricarboxylic acid, the modulator is trifluoroacetic acid and the stoichiometric ratio of trifluoroacetic acid to benzene-1,3,5-tricarboxylic acid is between 1.5:1 and 1:1.5. In one embodiment, the source of linker groups is benzene-1,3,5-tricarboxylic acid, the modulator is trifluoroacetic acid and the stoichiometric ratio of trifluoroacetic acid to benzene-1,3,5-tricarboxylic acid is between 1.2:1 and 1:1.2. In one embodiment, the source of linker groups is benzene-1,3,5-tricarboxylic acid, the modulator is trifluoroacetic acid and the stoichiometric ratio of trifluoroacetic acid to benzene-1,3,5-tricarboxylic acid is 1:1.

In one embodiment, the source of linker groups is benzene-1,3,5-tricarboxylic acid, the modulator is trichloroacetic acid and the stoichiometric ratio of trichloroacetic acid to benzene-1,3,5-tricarboxylic acid is between 2:1 and 1:2. In one embodiment, the source of linker groups is benzene-1,3,5-tricarboxylic acid, the modulator is trichloroacetic acid and the stoichiometric ratio of trichloroacetic acid to benzene-1,3,5-tricarboxylic acid is between 1.5:1 and 1:1.5. In one embodiment, the source of linker groups is benzene-1,3,5-tricarboxylic acid, the modulator is trichloroacetic acid and the stoichiometric ratio of trichloroacetic acid to benzene-1,3,5-tricarboxylic acid is between 1.2:1 and 1:1.2. In one embodiment, the source of linker groups is benzene-1,3,5-tricarboxylic acid, the modulator is trichloroacetic acid and the stoichiometric ratio of trichloroacetic acid to benzene-1,3,5-tricarboxylic acid is 1:1.

In one embodiment, the stoichiometric ratio of the source of metal ions to the modulator is between 1:0.1 and 1:500. In one embodiment, the stoichiometric ratio of the source of metal ions to the modulator is between 1:0.2 and 1:200.

In one embodiment, the method includes the following sequential steps (a) and (b):
(a) mixing the source of metal ions with the modulator; and
(b) adding the linker to the mixture formed in step (a).

In one embodiment, step (a) is carried out with stirring. In one embodiment, step (b) is carried out with stirring.

In one embodiment, the synthesis reaction is carried out at elevated temperature, typically by heating the mixture formed in step (b). Typically, the reaction is carried out at a temperature between 50° C. and 250° C. Preferably, the reaction is carried out at a temperature between 100° C. and 200° C. More preferably, the reaction is carried out at a temperature between 130° C. and 170° C.

In one embodiment, the reaction time is 12 to 120 hours. In one embodiment, the reaction time is 24 to 96 hours.

In one embodiment, the method further comprises removing the modulator from the composition of the invention following its synthesis, typically by washing. Without wishing to be bound by theory, it is believed that removing the modulator by washing leaves behind a composition having multiple hydroxyl groups on the A sites of the surface of the composition. The washing may be carried out using any liquid capable of removing the modulator. Typical substances used include water, alcohols (typically alcohols having 1 to 4 carbon atoms) and mixtures thereof. A particularly preferred example is a mixture of ethanol and water.

In one embodiment, an amount of the modulator remains in the composition following its synthesis. In one embodiment, a maximum of 10% of the modulator remains in the composition following its synthesis. In one embodiment, a maximum of 5% of the modulator remains in the composition following its synthesis. In one embodiment, a maximum of 3% of the modulator remains in the composition following its synthesis. In one embodiment, a maximum of 2% of the modulator remains in the composition following its synthesis. In one embodiment, a maximum of 1% of the modulator remains in the composition following its synthesis. In one embodiment, a maximum of 0.5% of the modulator remains in the composition following its synthesis. In one embodiment, a maximum of 0.3% of the modulator remains in the composition following its synthesis. In one embodiment, a maximum of 0.2% of the modulator remains in the composition following its synthesis. In one embodiment, a maximum of 0.1% of the modulator remains in the composition following its synthesis. These percentages are calculated by weight based on the total weight of the composition.

In one embodiment, the method is carried out in a solvent. Typical examples of suitable solvents include polar aprotic solvents, examples of which include N,N-dimethylformamide and dimethyl sulfoxide. The polar aprotic solvent may be present in a mixture with water. In one embodiment, the solvent is N,N-dimethylformamide.

In one embodiment, the stoichiometric ratio of the source of metal ions to the solvent is between 1:10 and 1:200.

In one embodiment, following reaction of the metal ion source and the linker source, the reaction mixture is cooled to a temperature of less than 10° C., typically between −10° C. and 10° C. This step is particularly preferred, as rapid cooling of the composition following the reaction results in a composition having particularly favourable surface properties. Typically, the cooling rate is from 2° C. to 20° C. per minute. In one embodiment, the cooling rate is from 5° C. to 15° C. per minute. In one embodiment, the cooling rate is from 8° C. to 12° C. per minute.

In one embodiment, the method further comprises removal of water, so as to cause the sites B to become Lewis acidic.

Applications of the Composition

Method of Polymerisation

In a further aspect of the invention, there is provided use of the composition of the invention as a catalyst, particularly although not exclusively as a catalyst to catalyse a polymerisation reaction.

In one aspect, there is provided a method of forming a polymer, the method comprising polymerising a monomer in the presence of a composition of the invention.

The catalyst may be used generally to catalyse polymerisation reactions well known to those skilled in the art. In these polymerisation reactions, the monomers may be the same (homopolymerisation) or different (copolymerisation).

The polymer thus formed is typically an organic polymer. A large number of organic polymers are known in the art. Examples of particular classes of organic polymers include polyolefins, polyesters, polycarbonates, polyamides, polyimides, polyether sulfones, and mixtures or derivatives thereof.

In one embodiment, the polymerisation is a chain-growth or addition polymerisation reaction. Examples of such polymerisation reactions include the polymerisation and co-polymerisation of ethylenically unsaturated monomers (i.e. compounds having one or more C=C bonds). In one embodiment, the ethylenically unsaturated monomer may be an alkene: in other words, an unsubstituted, unsaturated hydrocarbon (such as ethylene, propylene, 1-butene, 1-hexene, 4-methyl-1-pentene or styrene). In another embodiment, the ethylenically unsaturated monomer is substituted with one or more halogen atoms (such as vinyl chloride, vinylidene fluoride or tetrafluoroethylene). Examples of polymers produced from such ethylenically unsaturated monomers include, but are not limited to: polyethylenes; polypropylenes; poly(1-butene); poly(1-pentene); poly(1-hexene); poly(methyl pentene); polystyrene; poly(vinylidene fluoride); poly(tetrafluoroethylene) (PTFE—Teflon®); poly(methyl methacrylate); and mixtures thereof.

In one embodiment, the polymerisation is a step-growth or condensation polymerisation reaction. Examples of such polymerisation reactions include the polymerisation of polyols and polycarboxylic acids to produce polyesters, and the polymerisation of polyamines and polycarboxylic acids to produce polyamides.

In one embodiment, there is provided the use of the composition of the invention as a catalyst, to catalyse a reaction involving $CO_2$, which results in $CO_2$ being incorporated into the structure of the resultant molecule.

In one embodiment, the molecule with which the $CO_2$ reacts comprises a ring structure, such that the reaction causes opening of the ring so as to enable incorporation of the $CO_2$ into the molecule.

In one embodiment, the molecule with which the $CO_2$ reacts is a monomer, such that the resulting product is incorporated into the structure is a polymer. In this specification, such molecules are generally designated Y. In one embodiment, the polymer formed is a copolymer or terpolymer, at least one repeating unit of the polymer formed containing a $CO_2$ moiety and at least one repeating unit lacking the $CO_2$ moiety. In one embodiment, the polymer formed is a polycarbonate-polyether copolymer.

In one embodiment, the molecule Y with which the $CO_2$ reacts is a monomer, and the reaction facilities polymerisation such that the resulting product is incorporated into the structure is a polymer.

In one embodiment, the molecule Y is selected from an epoxide, a lactone or an anhydride.

In one embodiment, the molecule Y is an alkylene oxide, a cycloalkylene oxide or an aryl-substituted alkylene oxide. In one embodiment, the molecule Y is an alkylene oxide, a cycloalkylene oxide or an aryl-substituted alkylene oxide having a total of 2 to 30 carbon atoms. In one embodiment, the molecule Y is an alkylene oxide, a cycloalkylene oxide or an aryl-substituted alkylene oxide having a total of 2 to 20 carbon atoms. In one embodiment, the molecule Y is an alkylene oxide, a cycloalkylene oxide or an aryl-substituted alkylene oxide having a total of 2 to 10 carbon atoms. In one embodiment, the molecule Y is an alkylene oxide having 2 to 6 carbon atoms. In one embodiment, the molecule Y is an alkylene oxide having 2 to 4 carbon atoms. In one embodiment, the molecule Y is propylene oxide. In one embodiment, the molecule Y is ethylene oxide.

Therefore, in a further aspect of the invention, there is provided a method of forming a polymer in which $CO_2$ is incorporated into the structure of the polymer, the method comprising reacting:
(a) a molecule Y, which is a monomer capable of polymerising to form a polymer in which $CO_2$ is incorporated into the structure of the polymer; and
(b) $CO_2$;
in the presence of a composition comprising a bulk material; and
at least one surface;
the bulk material comprising ions of a metal M bonded to one another via linker groups;
the surface comprising ions of a metal M' bonded to one another via linker groups;
the metals M and M' being the same or different;
the surface comprising at least one first site A and at least one second, different site B;
the site A having a hydroxyl group bonded thereto, said site A optionally being capable of interacting with $CO_2$;
the site B being a Lewis acid site capable of binding a $CO_2$ molecule such that the bound $CO_2$ molecule can react with the monomer molecule Y;
wherein the distance d between the site A and site B is such that the molecule Y and the bound $CO_2$ can react together on the surface to form the polymer.

In one embodiment, the method is carried out at a temperature between 0 and 150° C.

In one embodiment, the method is carried out at a temperature between 20 and 100° C. In one embodiment, the method is carried out at a temperature between 40 and 80° C.

In one embodiment, the method is carried out at a temperature between 45 and 65° C. This is a lower temperature than was possible in the prior art processes which used zinc glutarate as the catalysts, and carries a particular advantage of energy and cost savings.

In one embodiment, the method is carried out at a total pressure between 0.1 and 50 MPa.

In one embodiment, the method is carried out at a total pressure between 0.3 and 30 MPa.

In one embodiment, the method is carried out at a total pressure between 0.5 and 10 MPa. This is a lower pressure than was possible in the prior art processes which used zinc glutarate as the catalysts, and carries the advantage of further energy and cost savings.

In one embodiment, the method is carried out for a time of between 30 seconds to 1 hour. This is a shorter time than was possible in the prior art processes which used zinc glutarate as the catalysts, and carries the advantage of further energy and cost savings.

Method of Cyclic Carbonate Formation including $CO_2$ Incorporation

In one embodiment, the $CO_2$ reacts with a molecule such that $CO_2$ is incorporated into the structure of the molecule without causing polymerisation. In this specification, such molecules are generally designated Y'.

In one embodiment, the molecule Y' is an epoxide. In this embodiment, the molecule formed is a cyclic carbonate.

In one embodiment, the molecule Y' is an alkylene oxide, a cycloalkylene oxide or an aryl-substituted alkylene oxide. In one embodiment, the molecule Y' is an alkylene oxide, a cycloalkylene oxide or an aryl-substituted alkylene oxide having a total of 2 to 30 carbon atoms. In one embodiment, the molecule Y' is an alkylene oxide, a cycloalkylene oxide or an aryl-substituted alkylene oxide having a total of 2 to 20 carbon atoms. In one embodiment, the molecule Y' is an alkylene oxide, a cycloalkylene oxide or an aryl-substituted alkylene oxide having a total of 2 to 10 carbon atoms. In one embodiment, the molecule Y' is an alkylene oxide having 2 to 6 carbon atoms. In one embodiment, the molecule Y' is an alkylene oxide having 2 to 4 carbon atoms. In one embodiment, the molecule Y' is propylene oxide. In one embodiment, the molecule Y' is ethylene oxide.

Therefore, in a further aspect, the invention provides a method of forming a cyclic carbonate in which $CO_2$ is incorporated into the structure of the cyclic carbonate, the method comprising reacting a molecule Y' with $CO_2$ in the presence of a composition comprising:
a bulk material; and
at least one surface;
the bulk material comprising ions of a metal M bonded to one another via linker groups;
the surface comprising ions of a metal M' bonded to one another via linker groups;
the metals M and M' being the same or different;
the surface comprising at least one first site A and at least one second, different site B;
the site A having a hydroxyl group —X bonded thereto;
the site B being a Lewis acid site capable of binding a $CO_2$ molecule such that the bound $CO_2$ molecule can react with the molecule Y';
the site B having a Lewis base bound thereto;
wherein the distance d" between the site A and site B is such that the molecule Y and the adsorbed $CO_2$ can react together on the surface to form the cyclic carbonate.

When the composition of the invention comprises B-sites to which a Lewis base is bound (as illustrated generally in FIG. 4), the reaction catalysed by the composition typically results in a cyclic carbonate.

Polymer Obtained by the Method

The invention also provides in a further aspect a polymer obtainable or obtained according to the method of the invention. The polymer may comprise one type of monomer (a homopolymer) or two or more type of monomer (a copolymer).

The polymer thus formed is typically an organic polymer. A large number of organic polymers are known in the art. Examples of particular classes of organic polymers include polyolefins, polyesters, polycarbonates, polyamides, polyimides, polyether sulfones, and mixtures or derivatives thereof.

Examples of polymers produced from ethylenically unsaturated monomers include, but are not limited to: polyethylenes; polypropylenes; poly(1-butene); poly(1-pentene); poly(1-hexene); poly(methyl pentene); polystyrene; poly(vinylidene fluoride); poly(tetrafluoroethylene) (PTFE—Teflon®); poly(methyl methacrylate); and mixtures thereof.

In one embodiment, the polymer formed is a copolymer or terpolymer, at least one repeating unit of the polymer formed containing a $CO_2$ moiety and at least one repeating unit lacking the $CO_2$ moiety.

In one embodiment, when the monomer Y is an epoxide, the polymer formed is a polycarbonate-polyether copolymer. Scheme 1 illustrates generally a ring-opening copolymerisation (ROCOP) between propylene oxide (PO) to produce poly(propylene) carbonate (PPC), poly(propylene) ether (PPE) and cyclic propylene carbonate (CPC).

Scheme 1

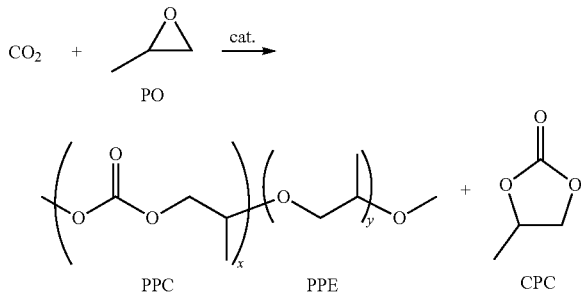

Depending on the structure of the catalyst composition, the resulting polymer may have differing proportions of carbonate and ether repeating units.

When the composition of the invention comprises linker units lacking a non-coordinating group R' as part of the linker (as illustrated generally in FIG. 1), the reaction catalysed by the composition typically results in a polycarbonate-polyether copolymer having a greater proportion of carbonate units compared with ether units (in Scheme 1, x is much greater than y), and a low proportion of cyclic carbonate by-product.

When the composition of the invention comprises linker units having a non-coordinating group R' as part of the linker (as illustrated generally in FIG. 2), the reaction catalysed by the composition typically results in a polycarbonate-polyether copolymer and a low proportion of cyclic carbonate by-product. However, in comparison with the compositions which lack a non-coordinating group R' as part of the linker, the compositions of the invention comprise linker units having a non-coordinating group R' as part of the typically results in a polycarbonate-polyether copolymer having a reduced proportion of carbonate units compared with ether units. The proportion of carbonate units varies depending on the nature of the non-coordinating group R' and the proportion of linker units which contain this group.

When the composition of the invention comprises linker units as illustrated generally in FIG. 3, the reaction catalysed by the composition typically results in a polycarbonate-polyether copolymer having a much lower proportion of carbonate units compared with ether units (in Scheme 1, x is much less than y), and a low proportion of cyclic carbonate by-product.

In one embodiment, the polymer has a carbonate linkage incorporation of greater than 70%, greater than 80%, greater than 85%, greater than 90%, greater than 97%, greater than 98%, or greater than 99%.

In one embodiment, the polymer has a number average molecular weight ($M_n$) of less than 10 kDa. In one embodiment, the polymer has a number average molecular weight ($M_n$) of between 2 and 9 kDa. As indicated above, the use of the composition according to the invention allows polymers having a lower molecular weight to be produced than was possible with similar compositions of the prior art. The number average molecular weight may be measured by size exclusion chromatography. As is known to the person skilled in the art, size exclusion chromatography is one of the high pressure liquid chromatography (HPLC) separation modes. Typically, the column used is filled with material containing many pores. When dissolved molecules of various sizes flow into the column, smaller dissolved molecules flow more slowly through the column because they penetrate deep into the pores, whereas large dissolved molecules flow quickly through the column because they do not enter the pores. Consequently, larger molecules elute from the column sooner and smaller molecules later, which effectively sorts the molecules by size. This is the separation principle of size exclusion chromatography. One example of such a method is described in Shimadzu Gel Permeation Chromatography System—Application Data Book—(C190-0032, p. 81).

General Method 1

A heterogeneous catalyst platform according to the invention containing two different metal ions $M^1$ and $M^2$ in a 4:1 molar ratio was synthesised by stirring a salt of $M^1$ (0.688 mmol) and $M^2$ (0.172 mmol) in a 0.108 M solution of a modulator in DMF (4 mL) at room temperature. Once homogenised, linker (0.430 mmol) in DMF was added and the solution stirred further. The resulting solution was sealed inside a 23 mL Teflon®-lined autoclave and heated to 150° C. for 48 hours, after which autoclaves were removed from the oven and rapidly cooled (at a rate of approximately 10° C. per minute) to less than 10° C. The synthesised heterogeneous catalyst platform was collected by filtration and washed with deionised water, then ethanol.

EXAMPLES

Example 1—Synthesis of Surface Engineered Composition of the Invention

Scandium nitrate hydrate (0.240 g) was dissolved into DMF (4 mL) and stirred vigorously at room temperature until dissolved. To the solution was added benzoic acid (0.550 g). The solution was stirred once again until homogeneous. To the solution was added benzene-1,3,5-tricarboxylic acid (0.091 g) and DMF (4 mL). The solution was stirred until homogeneous. The resulting solution was sealed inside a 23 mL Teflon®-lined autoclave and heated in an oven at 150° C. for 48 hours, after which the autoclaves were removed and rapidly cooled (at a rate of approximately 10° C. per minute) to less than 10° C. The synthesised compositions were filtered and washed with ethanol and water.

The composition has the general formula [$Sc_3O(OH)(BTC)_2$] as demonstrated by the techniques below.

A range of physicochemical techniques have been used to analyse the composition.

Figure 5:
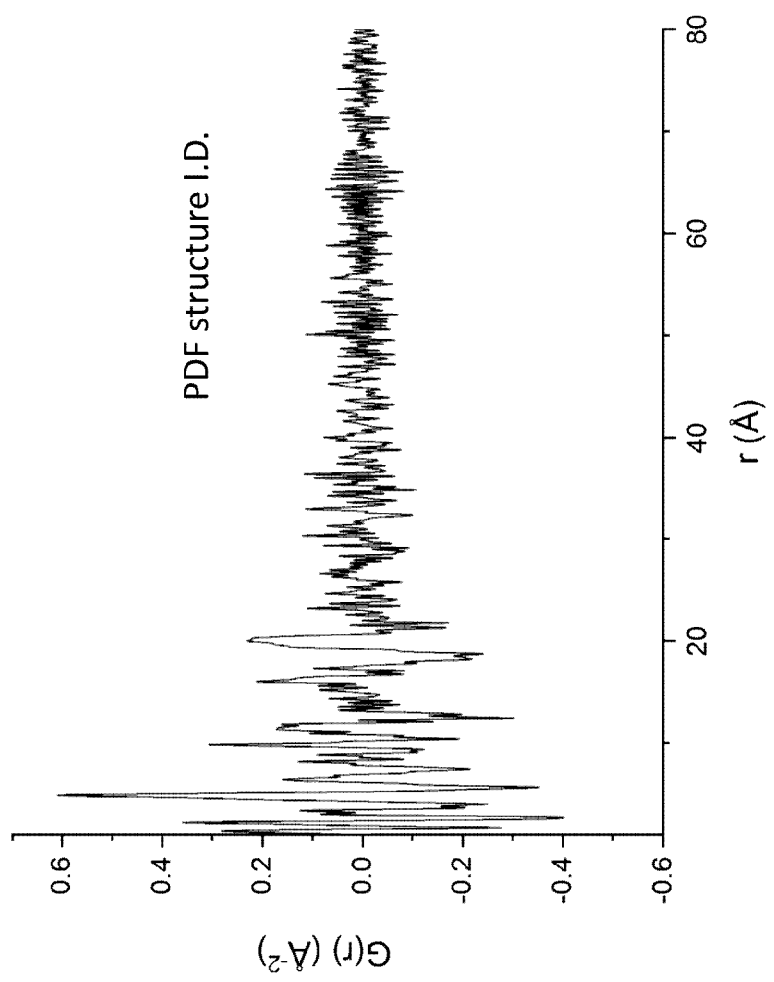
FIG. 5 is a Pair Distribution Function plot from a total scattering experiment of a composition according to Example 1 of the invention.
Figure 6:
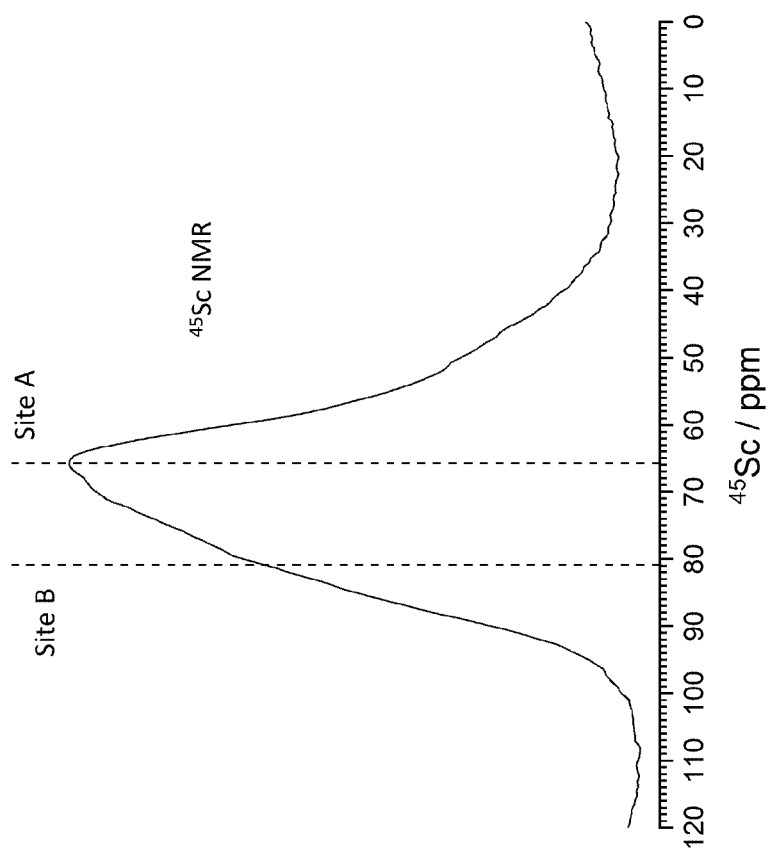
FIG. 6 is a $^{45}$Sc magic angle spinning (MAS) NMR spectrum of a composition according to Example 1 of the invention.
Figure 7:
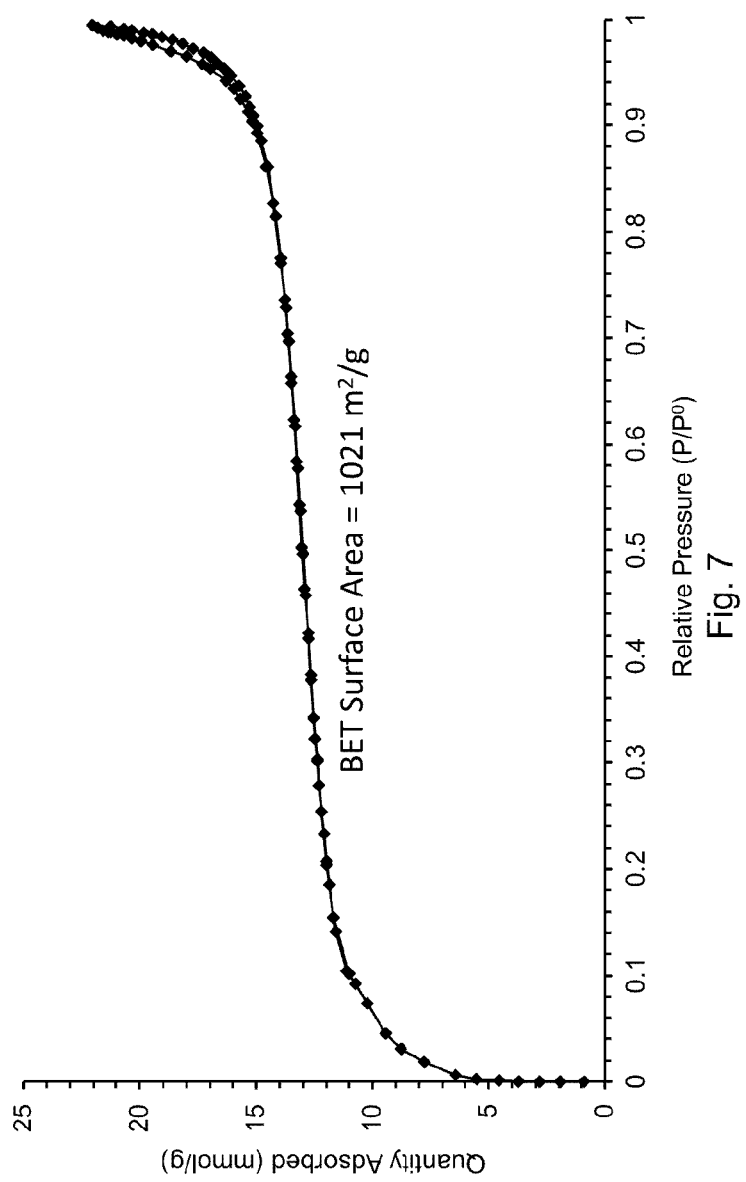
FIG. 7 is a nitrogen physisorption plot showing the specific surface area of a composition according to Example 1 of the invention.
Figures 8, 9:
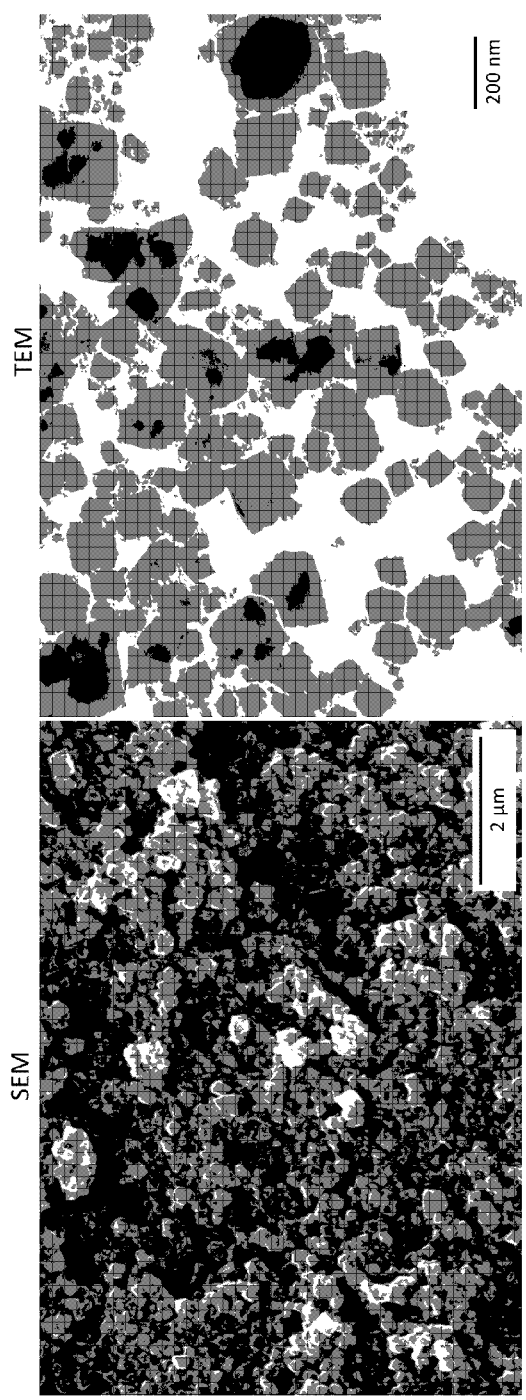
FIG. 8 is a scanning electron microscope (SEM) image of a composition according to Example 1 of the invention.
FIG. 9 is a transmission electron microscope (TEM) image of a composition according to Example 1 of the invention.

The PDF (FIG. 5) was used to establish that the scaffold structure crystallised correctly. $^{45}Sc$ MAS NMR (FIG. 6) confirmed the presence of A- and B-sites. $N_2$ Physisorption (FIG. 7) established the scaffold was porous, and provided surface area analysis. Electron microscopy (SEM and TEM) techniques confirmed particle-size distributions (FIGS. 8 and 9).

To assess catalytic efficiency, propylene oxide (5.000 g) was placed into a 100 mL PEEK liner. To the liner was added the surface-engineered catalyst (0.040 g). The liner was placed in the reactor base of a 100 mL Parr batch reactor unit and sealed to the head unit. The reactor was purged using $CO_2$, then filled to a pressure of 2 MPa of $CO_2$. The reactor was heated to 65° C., and the reaction time commenced upon reaching this temperature. After 4 hours the reactor was rapidly cooled over ice to 0° C. The product mixture was analysed by $^1H$ NMR spectroscopy in $CDCl_3$. The polymer product was analysed by size exclusion chromatography (SEC).

PDF Data was collected on a Rigaku R-Axis 3-circle Spider goniometer equipped with a curved Fujifilm image plate mounted at the window of a graphite monochromated sealed tube silver (Ag $Ka_1/Ka_2$=0.56094 Å) generator operating at 1.2 kW (40 kV, 30 mA). The sample was packed into a borosilicate capillary of diameter 1 mm with a 0.01 mm wall thickness. The capillary was placed at a distance of 127.4 mm from the detector. An exposure time of 84 s per degree ω of oscillation, with an oscillation ω of 84°, giving a total collection time of 117.6 minutes. The collected 2D powder pattern was integrated to a 1 D total scattering pattern using Rigaku 2DP software and transformed to a pair distribution function utilising GudrunX.

Magic Angle Spinning Nuclear Magnetic Resonance (MAS-NMR) measurements were collected at the UK 850 MHz Solid State NMR Facility on a wide bore 20.0 T Bruker AVANCE III spectrometer at the University of Warwick with a Neo Console, using a 4.0 mm HXY probe in double-resonance mode. The sample was loaded into 4.0 mm zirconium oxide Bruker NMR rotors with vespel turbines under an $N_2$ atmosphere. $^{45}Sc$ spectra ($^{45}Sc$ Larmor frequency=206.51 MHz) were referenced to a 1 mmol $ScCl_3$ in $D_2O$, using 192 scans and a pulse delay (d1) of 1 second. $N_2$ was used for the drive, bearing and purge. Measurements were carried out with a 13.5 kHz spin-rate.

$N_2$ adsorption measurements were performed using Micromeritics ASAP 2020 at liquid nitrogen temperature. Samples were degassed in vacuum at 150° C. Surface area measurements were determined using the Brunauer, Emmett and Teller (BET) model (originally described in J. Am. Chem. Soc. 1938, 60 (2): 309-319).

Scanning Electronic Microscopy (SEM) images were obtained using an FEI Quanta 250 FEG Scanning electron microscope, with samples mounted on carbon tape and sputter coated with 7 mm layer of platinum.

Transmission Electron Microscopy (TEM) images were obtained using a Hitachi HT7700 with a LaB6 filament installed and operated at an accelerating voltage of 100 kV. Samples were sonicated in ethanol, pipetted onto carbon film coated, 200 mesh copper TEM grids and allowed to dry in air before imaging.

Solution NMR for polymer analysis was conducted on a Bruker AV400 FT-NMR spectrometer in $CDCl_3$. Chemical shifts were referenced to tetramethylsilane (TMS).

Size Exclusion Chromatography (SEC/GPC) analysis was carried out on a Shimadzu LC-20AD instrument, equipped with a Refractive Index (RI) detector and two PSS SDV 5 μm linear M columns. HPLC grade THF was used the eluent at 1.0 mL/min at 30° C. Samples were passed through 0.2 μm PTFE filters prior to analysis. Monodisperse polystyrene standards were used for calibration. Narrow MW polystyrene standards were used to calibrate the instrument. The method is described in Shimadzu Gel Permeation Chromatography System—Application Data Book—(C190-0032, p. 81).

Example 2—Comparing Catalytic Activities of Surface Engineered Composition of the Invention with Known Catalysts The catalytic activity of a surface engineered composition according to the invention as prepared in Example 1 for the copolymerisation of propylene oxide and $CO_2$ was evaluated by yield of polymer, the amount of polycarbonate linkages (over polyether) vs. the theoretical maximum—a key indicator for $CO_2$ insertion, and its catalytic efficiency (turnover frequencies, TOF). Complete catalytic data are located in Table 1. The catalytic performance was compared with DMC catalysts and with zinc glutarate catalysts as described in the literature, under the conditions stated in the Table.

Reactions were conducted solvent-free, with neat epoxide, catalyst and $CO_2$ only. All reactions shown, unless stated otherwise, were performed without thermal treatment. This contrasts to the lengthy activation processes performed for current heterogeneous catalyst systems, which require lengthy dehydration under vacuum (ZnGAs) or exothermic pre-activation with the epoxide monomer (DMCs).

TABLE 1

Reaction conditions and activity data for heterogeneous copolymerisation catalysts.

| Catalyst | Conditions | Highest TOF | Carbonate Linkage | PDI | Molecular Weight, $M_n$ | Ref |
|---|---|---|---|---|---|---|
| ZnGA | 60-80° C. 20-40 h 4-5.2 MPa | 360 | >90% | 1.5-5.0 | >50 KDa | 1-4 |
| DMC | 50-90° C. 2-24 h 1-4 MPa | >1900 | 10-56% | 1.0-4.0 | 0.5-50 KDa | 5-8 |
| ZnGA/DMC Tandem | 70° C. 24 h 5 MPa | 80 | 98% | 1.9 | 380 KDa | 9 |
| Surface-engineered catalysts | 45-65° C. 0.3-6 h 0.1-2 MPa | >1400 | >95% | 2-4 | 1-20 KDa | This invention |

In Table 1, the references are as follows (1) M. Ree, et al, *J. Polym. Sci. Part Polym. Chem.*, 1999, 37, 1863-1876; (2) S. Klaus, et al. *J. Am. Chem. Soc.*, 2011, 133, 13151-13161; (3) R.-R. Ang, et al, *Chem. Eng. J.*, 2017, 327, 120-127; (4) J.-S. Kim, et al, *J. Catal.*, 2003, 218, 209-219; (5) 1. Kim et al, *Macromol. Symp.*, 2005, 224, 181-192; (6) I. Kim, et al, *Catal. Today*, 2006, 111, 292-296; (7) S. Chen, et al, *J. Polym. Sci. Part Polym. Chem.*, 2004, 42, 5284-5291; (8) N. Almora-Barrios, et al, *ChemCatChem*, 2015, 7, 928-935; (9) Q. Meng, et al, *J. CO2 Util.*, 2016, 16, 86-96.

Figure 10:
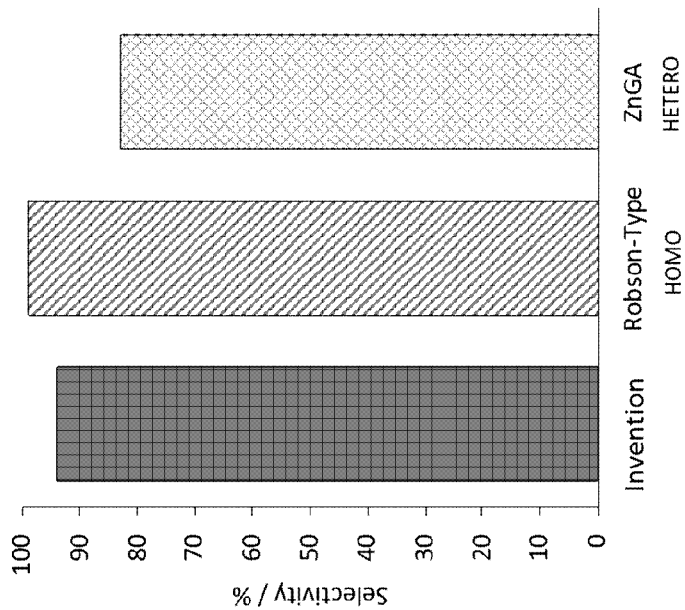
FIG. 10 illustrates the selectivity (for producing a polycarbonate-polyether copolymer over cyclic carbonate) of a composition according to one embodiment of the invention, compared with a Robson-type homogeneous catalyst and a zinc glutarate heterogeneous catalyst.
Figure 13:
FIG. 13 is a transmission electron microscope (TEM) image of a composition according to Example 4, Composition 2 of the invention.
Figure 12:
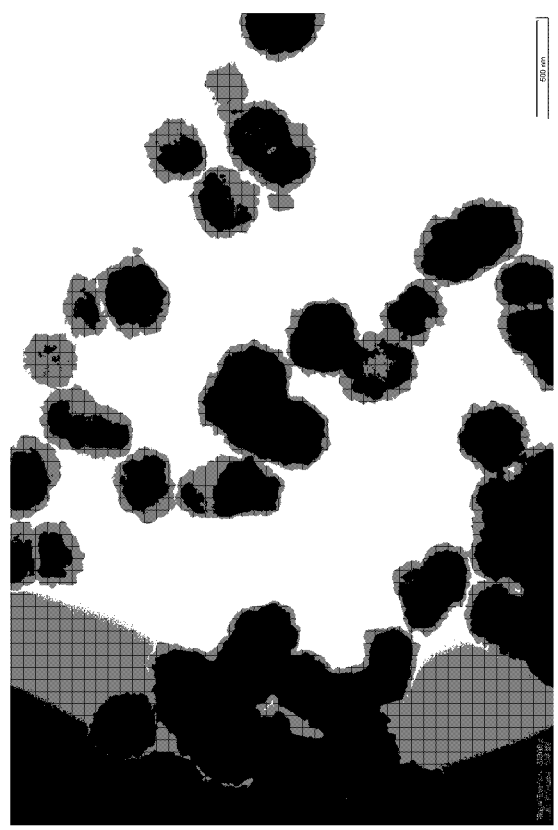
FIG. 12 is a transmission electron microscope (TEM) image of a composition according to Example 4, Composition 1 of the invention.
Figure 15:
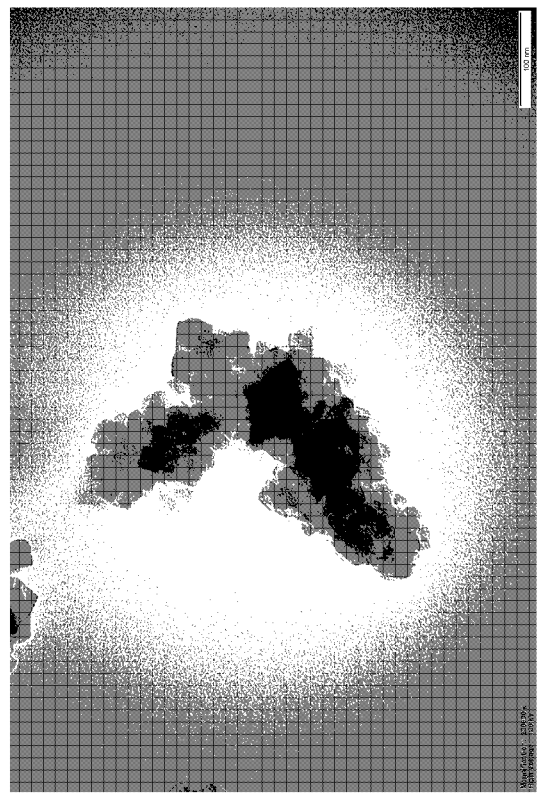
FIG. 15 is a transmission electron microscope (TEM) image of a composition according to Example 4, Composition 4 of the invention.
Figure 14:
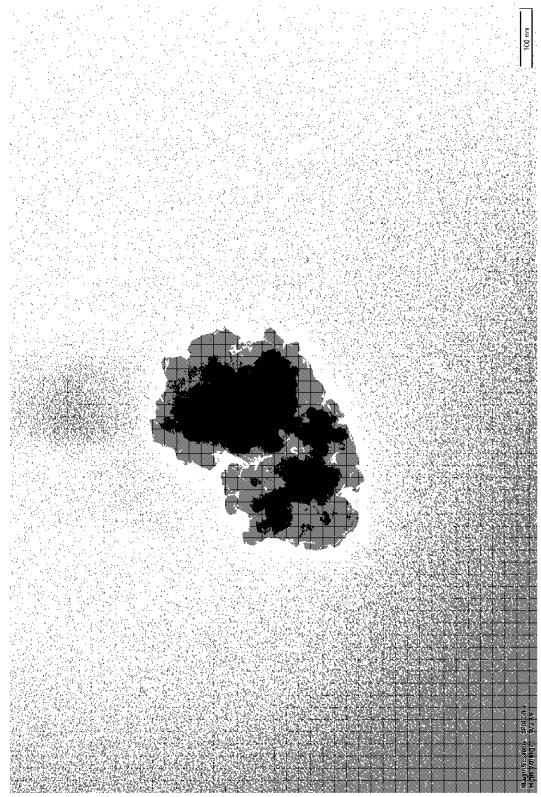
FIG. 14 is a transmission electron microscope (TEM) image of a composition according to Example 4, Composition 3 of the invention.

The selectivity of a composition of the invention for producing a polycarbonate-polyether copolymer (compared with cyclic carbonate) is illustrated in FIG. 10. As can be seen, the selectivity is comparable with a Robson-type homogeneous catalyst and improved compared with a zinc glutarate heterogeneous catalyst.

Figure 11:
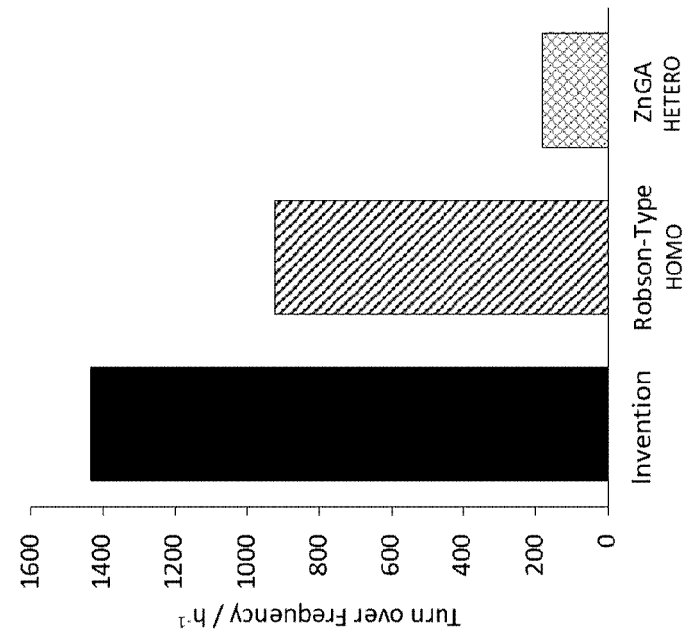
FIG. 11 illustrates the turnover frequency, defined as: (Mass of polymer)/(Mass of active metal in catalyst*reaction time), of a composition according to one embodiment of the invention, compared with a Robson-type homogeneous catalyst and a zinc glutarate heterogeneous catalyst.

The turnover frequency in this polymerisation reaction, defined as: (Mass of polymer)/(Mass of active metal in catalyst*reaction time), of a composition of the invention is illustrated in FIG. 11. As can be seen, the turnover frequency of this composition in this reaction is around 50% improved compared with a Robson-type homogeneous catalyst and around 8 times that of a zinc glutarate heterogeneous catalyst.

Table 1 and the data in FIGS. 10 and 11 show the surface-engineered composition according to the invention showed superior catalytic activity compared with both the synthesised ZnGA catalyst, and those reported in the literature producing polymers with a high fraction of carbonate linkages and consistent dispersity (Đ). These results were achieved using temperature and pressure regimes lower than those reported in the literature. Under these conditions, ZnGA catalysts provide no appreciable conversion to cyclic- or poly-carbonate materials. To induce reactivity, ZnGA systems require an increase in pressure to 4 MPa, and an increase in temperature to 80° C. Under select conditions, the surface-engineered catalysts are capable of achieving TOF frequencies in excess of 1400 $h^{-1}$, while providing comparable carbonate linkages in the polymer backbone.

Under identical conditions in which the cyclic carbonate is used as the starting material, no polymerisations observed, confirming the cyclic carbonate is formed by a competing parallel reaction, and is not an intermediate in the polymerisation process.

It is clear from these results that the surface engineered composition of the invention allows carbon dioxide and propylene oxide to be uniquely activated in a manner not previously observed in MOF-based catalysis chemistry, to provide exceptional catalytic activity and a high level of $CO_2$ utilisation potential. Without wishing to be bound by theory we propose a copolymerisation pathway that is illustrated in Scheme 2, where the metal M is Sc, the left-hand site being an A-site and the right-hand site being a B-site (identified in box (a)). This is supported by the observed $^{41}Sc$ MAS-NMR spectra in FIG. 6.

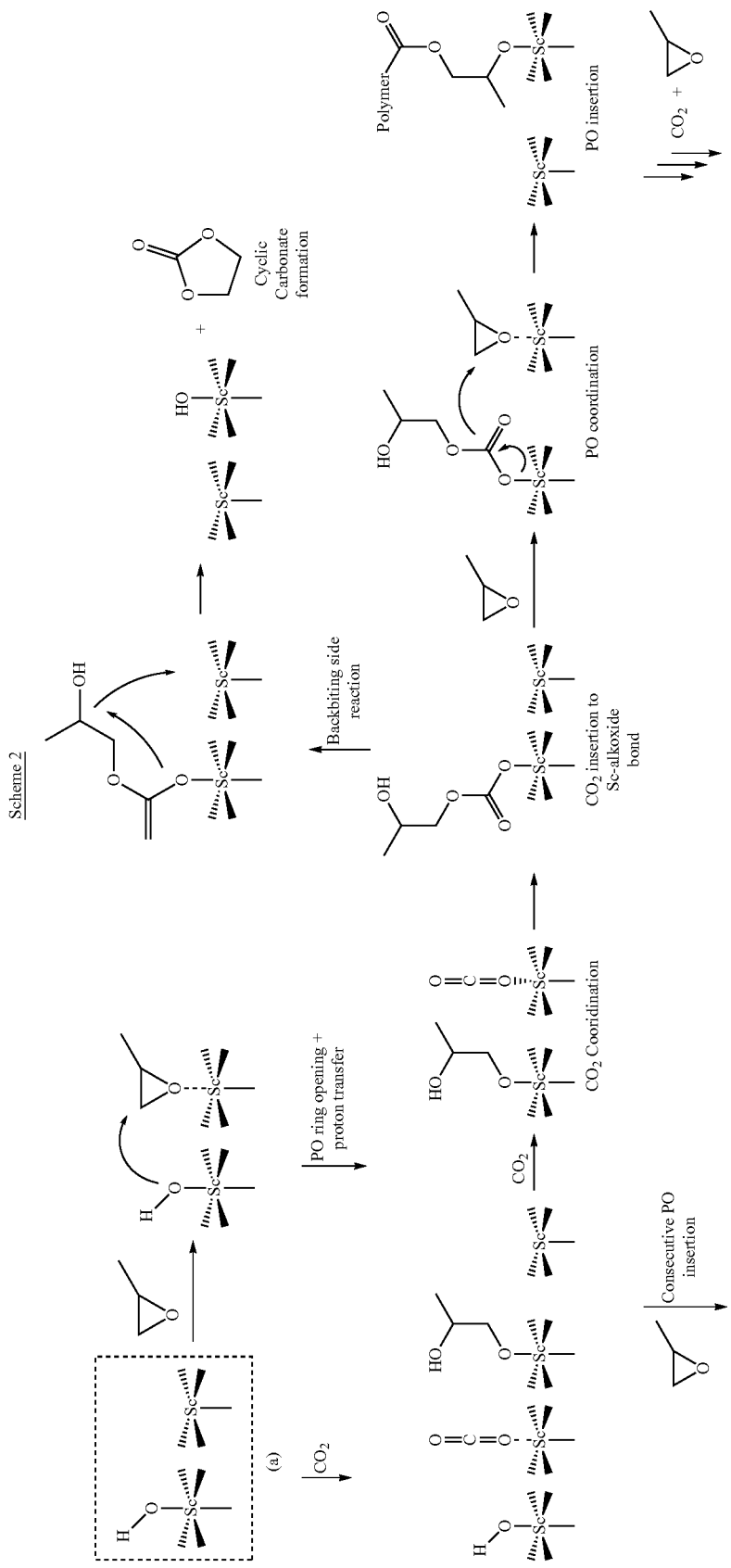

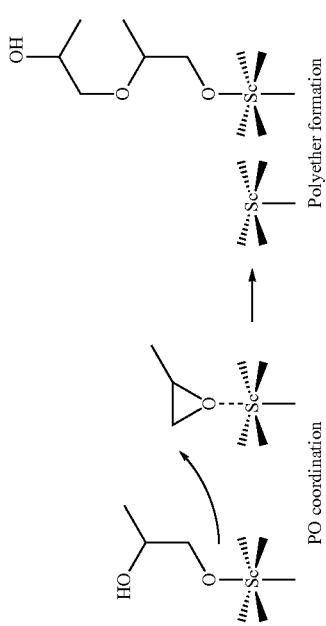

Example 3—Synthetic Method for Producing a Composition of the Invention Having Two Different Metal Ions A heterogeneous catalyst platform was synthesis by stirring scandium nitrate (0.688 mmol) and chromium nitrate hexahydrate (0.172 mmol) in a 0.108 M solution of acetic acid in DMF (4 mL) at room temperature. Once homogenised, benzene-1,3,5-tricarboxylic acid (BTC, 0.430 mmol) in DMF was added and the solution stirred further. The resulting solution was sealed inside a 23 mL Teflon®-lined autoclave and heated to 150° C. for 48 hours, after which autoclaves were removed from the oven and rapidly cooled (at a rate of approximately 10° C. per minute) to less than 10° C. The synthesised heterogeneous catalyst platform was collected by filtration and washed with deionised water, then ethanol.

Example 4—Further Compositions of the Invention with Different Modulators

A number of further surface engineered compositions were prepared using a variety of modulators and different modulator:linker ratios. For comparison, a control was prepared without the modulator. Compositions 1 to 4 were prepared as generally described in Example 1. Compositions 5 and 6 were prepared according to General Method 1.

The compositions, the modulators used and the molar ratio of modulator to source of linker groups are shown in Table 2 below. In Table 2, the abbreviations have the following meanings:
BTC=benzene-1,3,5-tricarboxylic acid
TFA=trifluoroacetic acid
TCA=trichloroacetic acid
BA=benzoic acid

TABLE 2

| Comp No | Metal ion(s) (molar ratio) | Linker | Modulator | Modulator:linker molar ratio | Average Crystallite Size (nm) |
|---|---|---|---|---|---|
| Control | $Sc^{3+}$ | BTC | None | N/A | 66 ± 8 |
| 1 | $Sc^{3+}$ | BTC | TFA | 1:1 | 67 ± 7 |
| 2 | $Sc^{3+}$ | BTC | BA | 10:1 | 49 ± 4 |
| 3 | $Sc^{3+}$ | BTC | TCA | 1:1 | 35 ± 1 |
| 4 | $Sc^{3+}$ | BTC | TCA | 10:1 | 41 ± 2 |
| 5 | $Sc^{3+}/Cr^{3+}$ (4:1) | BTC | TCA | 10:1 | 18 ± 1 |
| 6 | $Sc^{3+}/Al^{3+}$ (4:1) | BTC | TCA | 10:1 | 31 ± 1 |

The compositions were examined by TEM, using the same equipment and methods as used in Example 1. The average crystallite size was measured using ImageJ software (available from imagej.nih.gov) according to the method described in C. A. Schneider et al., *Nature Methods*, 2012, 9(7), 671-675.

Figure 16:
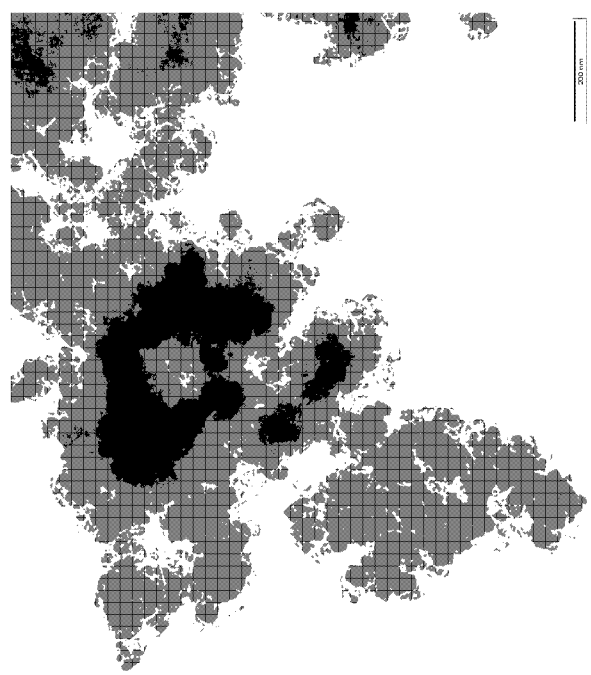
FIG. 16 is a transmission electron microscope (TEM) image of the control composition described in Example 4 with no modulator.

The TEM images of Compositions 1 to 4 are shown in FIGS. 12 to 15 respectively, and that of the control in FIG. 16. As can be seen from the TEM images, crystallite size and particle morphology differ depending on the identity of the modulator and the modulator:linker stoichiometry. In the control composition, without modulator, particles are large agglomerates with no discernible shape and an average crystallite size of circa. 66 nm. Using TFA as modulator in Composition 1, it is possible to obtain uniform spherical particles of circa 300 nm size, composed of 67 nm crystallites. Using BA in Composition 2, it is possible to obtain a very large distribution of single crystallites, which do not agglomerate at all.

Example 5—Catalytic Activity of the Compositions of Example 4

The catalytic activity of the surface engineered compositions as prepared in Example 4 in catalysing the copolymerisation of propylene oxide and $CO_2$ was evaluated by comparing the number average molecular weight ($M_n$) and dispersity of the polymer thus synthesised. The results are shown in Table 3. The number average molecular weight ($M_n$) were measured using size exclusion chromatography using the equipment and method described in Example 1. The dispersity (Ð) is calculated as the number average molecular weight ($M_n$) divided by the weight average molecular weight ($M_w$). Both $M_n$ and $M_w$ were measured using size exclusion chromatography using the same equipment and method described in Example 1.

TABLE 3

| Comp No | Polymer $M_n$ (kDa) | Dispersity Ð |
|---|---|---|
| Control | 5.1 | 3.1 |
| 1 | 6.4 | 3.0 |
| 2 | 3.1 | 2.4 |
| 3 | 8.6 | 3.9 |
| 4 | 5.8 | 3.5 |
| 5 | 5.5 | 3.8 |
| 6 | 8.7 | 4.5 |

By way of comparison, the number average molecular weights ($M_n$) and dispersities of the poly(propylene carbonate) polymers formed using the zinc glutaracetate/double metal cyanide composite catalysts described in Meng et al. are shown in Table 4. As is clear from a comparison of the data in Tables 3 and 4, the compositions of the invention are able to catalyse the copolymerisation of propylene oxide and $CO_2$ to produce polymers which have a much lower molecular weight ($M_n$) which are commercially more useful than those with a higher $M_n$.

TABLE 4

| Catalyst | Polymer $M_n$ (kDa) | Dispersity Ð |
|---|---|---|
| ZnGA1 | 180 | 1.4 |
| ZnGA2 | 190 | 1.9 |
| DMC | 11 | 2.3 |
| ZnGA2/DMC 10:1 | 14 | 2.4 |
| ZnGA/DMC 1:1 | 150 | 2.3 |
| ZnGA/DMC 10:1 | 200 | 1.9 |
| ZnGA/DMC 20:1 | 240 | 1.9 |

We have demonstrated the first example of a recyclable surface engineered hybrid catalyst, capable of selectively producing a poly(propylene)carbonate from propylene oxide and carbon dioxide under much milder conditions than those currently explored in the literature. The afforded polymer backbone contains a very high percentage of carbonate linkages, exhibiting the catalyst's ability to insert $CO_2$ efficiently—an important step in the development of carbon capture utilisation technologies. The surface engineered catalyst according to the invention is able to provide such superior catalysis, without the use of a co-catalyst, with near four-fold increase in turn-over frequency compared to the most widely used commercial catalyst.

All publications mentioned in the above specification are herein incorporated by reference. Various modifications and variations of the present invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry, materials science or related fields are intended to be within the scope of the following claims.

The invention claimed is:

1. A method of forming a polymer, the method comprising polymerising a monomer in the presence of a composition comprising:
   a bulk material having at least one surface, said bulk material functions as a framework or scaffold for the at least one surface
   the bulk material comprising ions of a metal M bonded to one another via linker groups;
   the surface comprising ions of a metal M' bonded to one another via linker groups;
   the metals M and M' being the same or different;
   the surface comprising at least one first site A and at least one second, different site B;
   the site A having a hydroxyl group bonded thereto, said site A capable of interacting with a monomer molecule;
   the site B being a Lewis acid site capable of interacting with a monomer molecule;
   wherein the distance d between the site A and site B is such that the monomer molecules can polymerise on the surface to form the polymer.

2. A method according to claim 1, wherein the metal ions M and M' are selected from $Sc^{3+}$, $Cr^{3+}$, $Al^{3+}$ and $Fe^{3+}$.

3. A method according to claim 1, wherein the linker groups are of the structure $T(R)_x(R')_y(H)_z$ wherein:
   T is a multivalent organic moiety;
   R is a functional group capable of coordinating to metal ions M and M';
   R' is a functional group incapable of coordinating to metal ions M and M', the functional group being other than H;
   x is 2 to 6;
   y is 0 to 4; and
   z is a number sufficient to occupy the remaining valencies on T.

4. A method according to claim 3, wherein T is a cycloalkyl, heterocycloalkyl, aryl or heteroaryl ring.

5. A method according to claim 4, wherein R is —$CO_2H$.

6. A method according to claim 3, wherein R' is selected from —$SO_3H$, $C_{1-6}$ alkyl and halogen.

7. A method according to claim 1, wherein the distance d is between 0.3 and 1 nm.

8. A method according to claim 1, wherein the composition has the general formula $[Sc_3O(OH)(BTC)_2]$ where BTC is benzene-1,3,5-tricarboxylic acid.

9. A method according to claim 1, wherein the polymer formed is a polycarbonate-polyether copolymer.

10. A method according to claim 1, wherein the method is carried out at a temperature between 45 and 65° C.

11. A method according to claim 1, wherein the method is carried out at a pressure between 0.1 and 10 MPa.

12. A method according to claim 1, wherein the polymer formed is a polyether or polyester.

13. A method of forming a polymer in which $CO_2$ is incorporated into the structure of the polymer, the method comprising reacting:
   (a) a molecule Y, which is a monomer capable of polymerising to form a polymer in which $CO_2$ is incorporated into the structure of the polymer; and
   (b) $CO_2$;
in the presence of a composition comprising:
   a bulk material having; at least one surface, said bulk material functions as a framework or scaffold for the at least one surface
   the bulk material comprising ions of a metal M bonded to one another via linker groups;
   the surface comprising ions of a metal M' bonded to one another via linker groups;
   the metals M and M' being the same or different;
   the surface comprising at least one first site A and at least one second, different site B;
   the site A having a hydroxyl group bonded thereto, said site A optionally being capable of interacting with $CO_2$;
   the site B being a Lewis acid site capable of binding a $CO_2$ molecule such that the bound $CO_2$ molecule can react with the monomer molecule Y;
   wherein the distance d between the site A and site B is such that the molecule Y and the bound $CO_2$ react together on the surface to form the polymer.

14. A method according to claim 13, wherein the metal ions M and M' are selected from $Sc^{3+}$, $Cr^{3+}$, $Al^{3+}$ and $Fe^{3+}$.

15. A method according to claim 13, wherein the linker groups are of the structure $T(R)_x(R')_y(H)_z$ wherein:
   T is a multivalent organic moiety;
   R is a functional group capable of coordinating to metal ions M and M';
   R' is a functional group incapable of coordinating to metal ions M and M', the functional group being other than H;
   x is 2 to 6;
   y is 0 to 4; and
   z is a number sufficient to occupy the remaining valencies on T.

16. A method according to claim 15, wherein T is a cycloalkyl, heterocycloalkyl, aryl or heteroaryl ring.

17. A method according to claim 16, wherein R is —$CO_2H$.

18. A method according to claim 15, wherein R' is selected from —$SO_3H$, $C_{1-6}$ alkyl and halogen.

19. A method according to claim 13, wherein the distance d is between 0.3 and 1 nm.

20. A method according to claim 13, wherein the composition has the general formula $[Sc_3O(OH)(BTC)_2]$ where BTC is benzene-1,3,5-tricarboxylic acid.

21. A method according to claim 13, wherein the molecule Y is propylene oxide.

22. A method according to claim 13, wherein the polymer formed is a polycarbonate-polyether copolymer.

23. A method according to claim 13, wherein the method is carried out at a temperature between 45 and 65° C.

24. A method according to claim 13, wherein the method is carried out at a pressure between 0.1 and 10 MPa.

25. A method according to claim 13, wherein the polymer formed is a polyether or polyester.

* * * * *